United States Patent
Tsujikawa et al.

(10) Patent No.: US 9,905,243 B2
(45) Date of Patent: Feb. 27, 2018

(54) SPEECH PROCESSING SYSTEM, SPEECH PROCESSING METHOD, SPEECH PROCESSING PROGRAM, VEHICLE INCLUDING SPEECH PROCESSING SYSTEM ON BOARD, AND MICROPHONE PLACING METHOD

(71) Applicant: NEC Corporation, Minato-ku, Tokyo (JP)

(72) Inventors: Masanori Tsujikawa, Tokyo (JP); Ken Hanazawa, Tokyo (JP); Akihiko Sugiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/892,396

(22) PCT Filed: Jan. 16, 2014

(86) PCT No.: PCT/JP2014/050654
§ 371 (c)(1),
(2) Date: Nov. 19, 2015

(87) PCT Pub. No.: WO2014/188735
PCT Pub. Date: Nov. 27, 2014

(65) Prior Publication Data
US 2016/0111109 A1    Apr. 21, 2016

(30) Foreign Application Priority Data
May 23, 2013   (JP) .................................. 2013-109006

(51) Int. Cl.
*G10L 21/0216* (2013.01)
*H04R 3/00* (2006.01)
(Continued)

(52) U.S. Cl.
CPC ...... *G10L 21/0216* (2013.01); *B60R 11/0247* (2013.01); *H04R 3/005* (2013.01);
(Continued)

(58) Field of Classification Search
None
See application file for complete search history.

(56) References Cited

U.S. PATENT DOCUMENTS 5,715,319 A * 2/1998 Chu ...................... H04R 3/005
                                                    381/26
6,130,949 A * 10/2000 Aoki ....................... G10H 3/125
                                                    381/94.3
(Continued)

FOREIGN PATENT DOCUMENTS

DE     102005002865 B3    6/2006
EP           0624046 A1   11/1994
(Continued)

OTHER PUBLICATIONS

International Search Report for PCT Application No. PCT/JP2014/050654, dated Apr. 1, 2014.
(Continued)

*Primary Examiner* — Pierre-Louis Desir
*Assistant Examiner* — Jonathan Kim

(57) ABSTRACT

A system of this invention is directed to a speech processing system that efficiently performs noise suppression processing for a plurality of noise sources spreading in a lateral direction with respect to a speaker of interest. The speech processing system includes a microphone array including a plurality of microphones, each of which inputs a sound mixture including speech of a speaker of interest and noise from a noise source region including a plurality of noise sources placed in a lateral direction with respect to the speaker of interest, and outputs a mixture signal including a
(Continued)

speech signal and a noise signal, the plurality of microphones being arranged such that a difference between respective distances from the plurality of microphones to the speaker of interest becomes different from a difference between respective distances from the plurality of microphones to the noise source region, and a noise suppressor that suppresses the noise based on the mixture signals output from the plurality of microphones.

15 Claims, 27 Drawing Sheets

(51) Int. Cl.
*B60R 11/02* (2006.01)
*B60R 11/00* (2006.01)

(52) U.S. Cl.
CPC ............... *B60R 2011/0028* (2013.01); *G10L 2021/02166* (2013.01); *H04R 2227/001* (2013.01); *H04R 2499/13* (2013.01)

(56) References Cited

U.S. PATENT DOCUMENTS

| | | | | |
|---|---|---|---|---|
| 7,003,099 | B1* | 2/2006 | Zhang | H04M 9/082 379/388.02 |
| 7,062,049 | B1* | 6/2006 | Inoue | G10K 11/1786 381/71.4 |
| 7,146,013 | B1* | 12/2006 | Saito | H04R 3/005 381/92 |
| 2002/0009203 | A1* | 1/2002 | Erten | H04R 1/406 381/92 |
| 2003/0160862 | A1* | 8/2003 | Charlier | H04N 5/23238 348/14.08 |
| 2004/0208334 | A1* | 10/2004 | Bryson | B60R 1/12 381/365 |
| 2005/0195989 | A1* | 9/2005 | Sato | B25J 13/003 381/92 |
| 2006/0165242 | A1* | 7/2006 | Miki | H04R 3/005 381/59 |
| 2008/0158096 | A1* | 7/2008 | Breed | B60N 2/002 345/7 |
| 2009/0216526 | A1* | 8/2009 | Schmidt | G10L 21/0208 704/226 |
| 2010/0014683 | A1* | 1/2010 | Maeda | G10K 11/178 381/71.4 |
| 2010/0166215 | A1* | 7/2010 | Herman | H04R 1/086 381/94.1 |
| 2010/0208911 | A1* | 8/2010 | Maeda | G10K 11/1782 381/73.1 |
| 2010/0322437 | A1* | 12/2010 | Matsuo | G10L 21/0208 381/94.2 |
| 2011/0103617 | A1* | 5/2011 | Shin | H03G 3/32 381/107 |
| 2011/0110531 | A1* | 5/2011 | Klefenz | G01S 3/809 381/92 |
| 2011/0194719 | A1* | 8/2011 | Frater | H04R 27/00 381/332 |
| 2012/0027241 | A1* | 2/2012 | Turnbull | H04R 1/023 381/365 |
| 2012/0182429 | A1* | 7/2012 | Forutanpour | H04R 3/005 348/175 |
| 2012/0284023 | A1* | 11/2012 | Vitte | H04M 9/082 704/233 |
| 2013/0039503 | A1* | 2/2013 | Beaucoup | H04M 9/082 381/66 |
| 2013/0051591 | A1* | 2/2013 | Dannesboe | H04R 1/086 381/322 |
| 2013/0321625 | A1* | 12/2013 | Yanagihara | H04R 1/32 348/143 |
| 2014/0185826 | A1* | 7/2014 | Tawada | G10L 21/0232 381/94.1 |
| 2014/0286504 | A1* | 9/2014 | Iwai | H04R 1/028 381/86 |
| 2015/0181338 | A1* | 6/2015 | Hosoi | H04R 1/02 381/309 |

FOREIGN PATENT DOCUMENTS

| | | | | |
|---|---|---|---|---|
| EP | 2056295 | A2 | 5/2009 | |
| JP | 05-173581 | A | 7/1993 | |
| JP | 06-067691 | A | 3/1994 | |
| JP | 2003-111185 | A | 4/2003 | |
| JP | 2006-222969 | A | 8/2006 | |
| JP | 2011-007861 | A | 1/2011 | |
| KR | 20090061220 | A * | 6/2009 | |
| KR | 20090061220 | A1 * | 6/2009 | ............... H04R 1/08 |
| WO | 2009/064877 | A1 | 5/2009 | |
| WO | 2012/165657 | A1 | 12/2012 | |

OTHER PUBLICATIONS

Extended European Search Report for EP Application No. EP14800753.7 dated on Mar. 31, 2017.

* cited by examiner

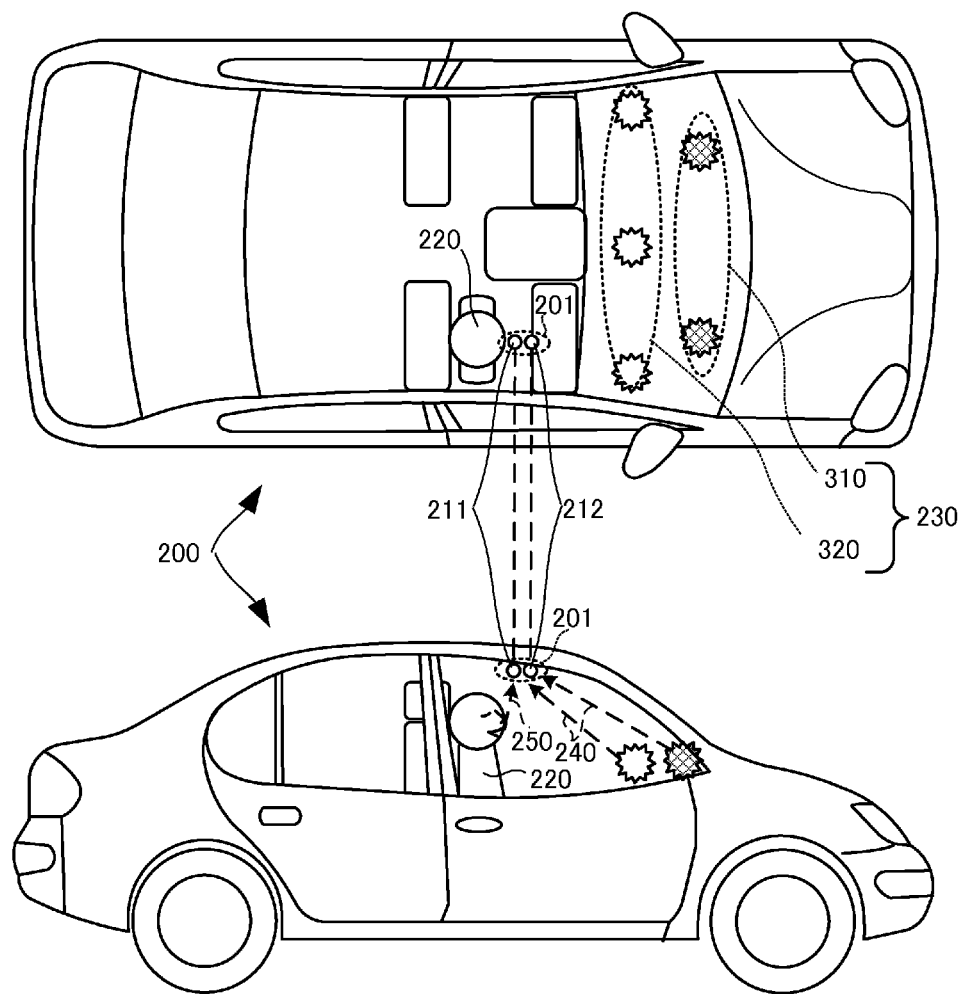
F I G. 3B

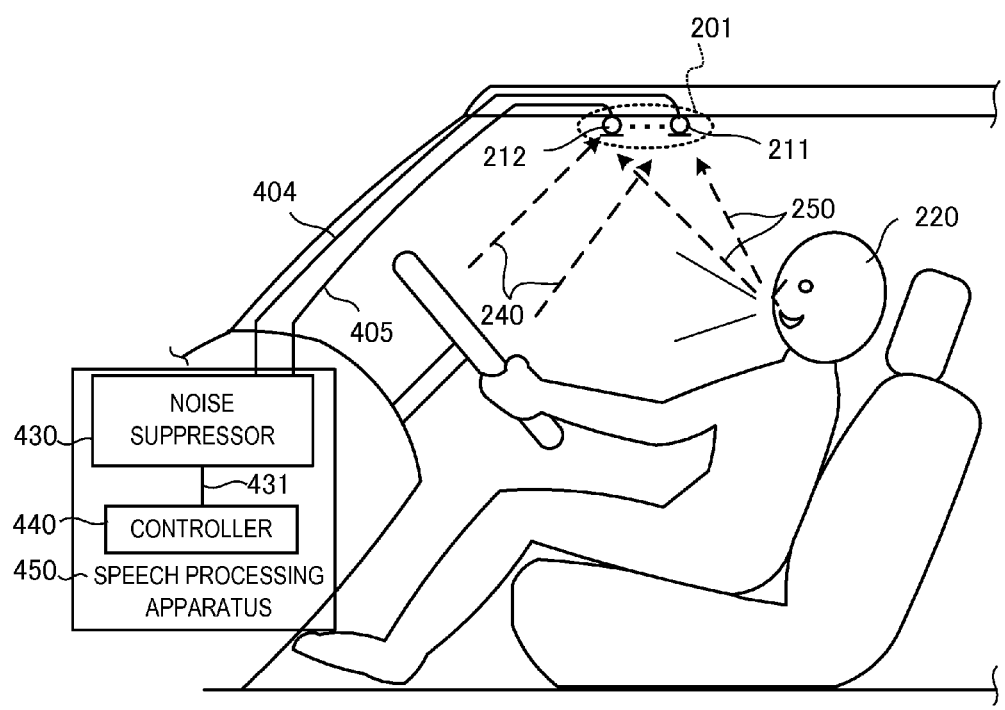
F I G. 4

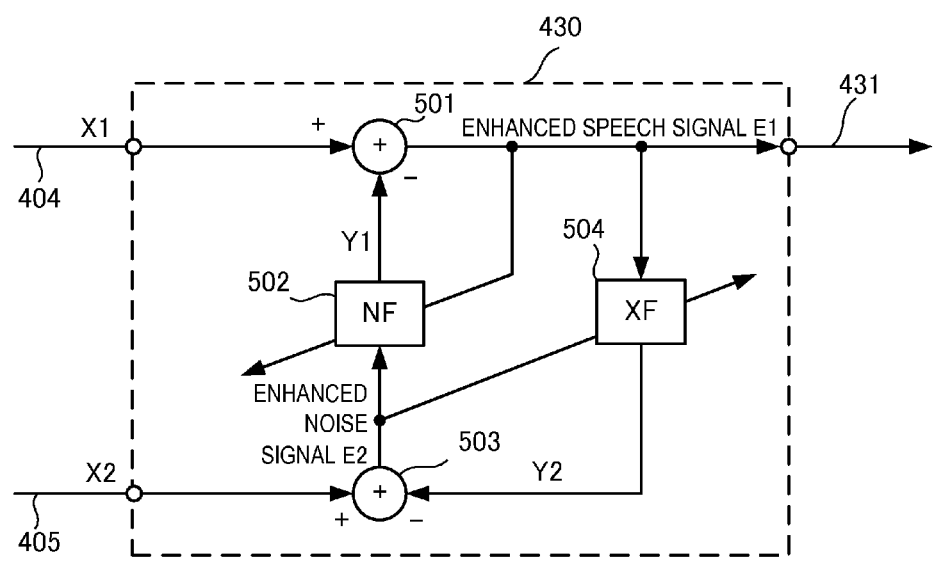
F I G. 5

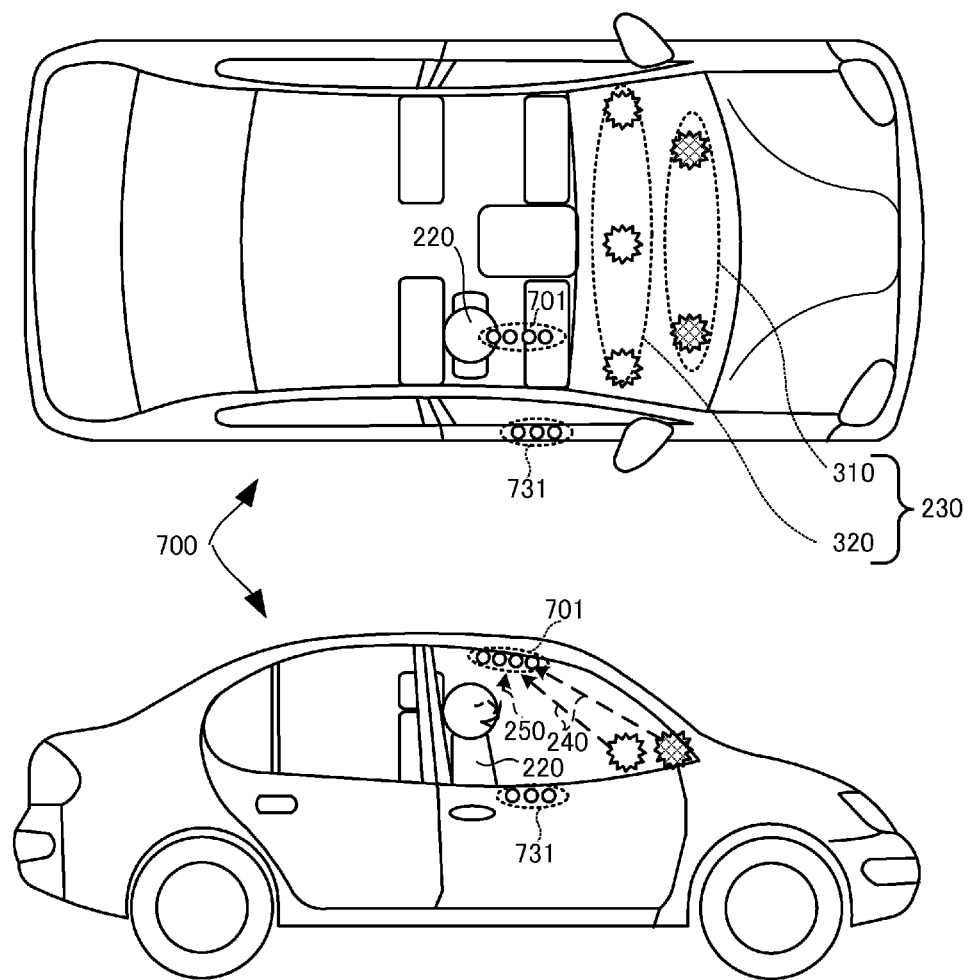
F I G. 7

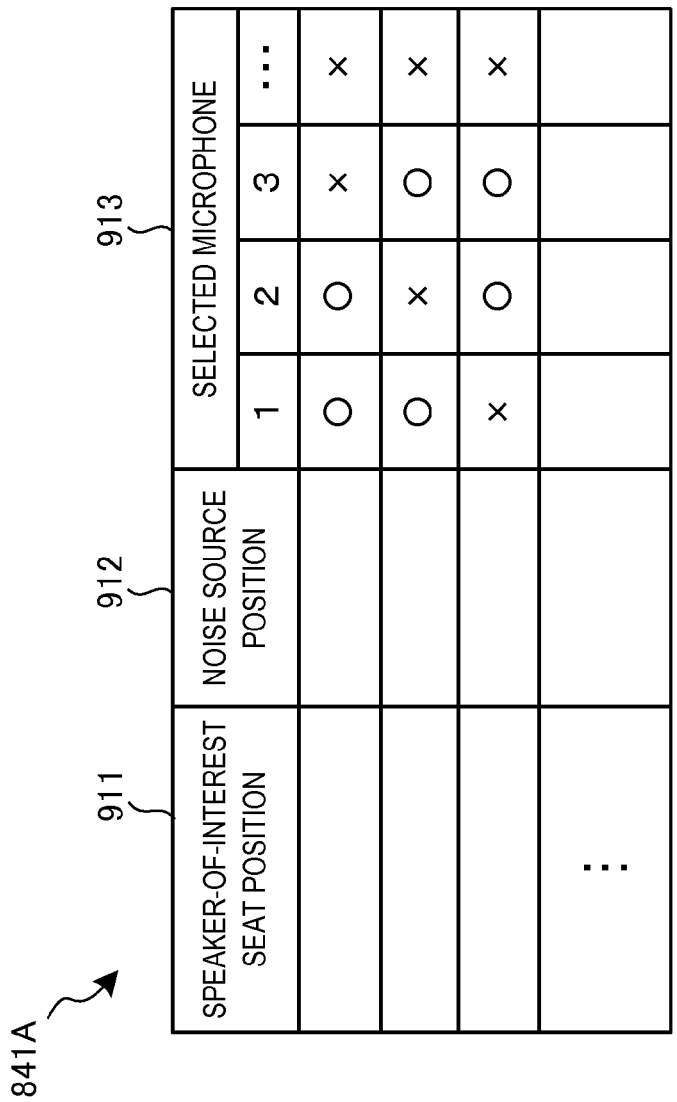
F I G. 9A

| MICROPHONE ID | MICROPHONE POSITION | SPEAKER-OF-INTEREST SEAT POSITION | DISTANCE BETWEEN MICROPHONE AND SPEAKER OF INTEREST | NOISE SOURCE POSITION | DISTANCE BETWEEN MICROPHONE AND NOISE SOURCE | SELECTION / NONSELECTION |
|---|---|---|---|---|---|---|
| 921 | 922 | 923 | 924 | 925 | 926 | 927 |
| 1 | | | | | | ○ |
| 2 | | | | | | × |
| 3 | | | | | | ○ |
| ... | | | | | | |

| AIR CONDITIONER | AUDIO | SELECTED MICROPHONE | | | |
|---|---|---|---|---|---|
| | | 1 | 2 | 3 | ... |
| ON | OFF | ○ | ○ | × | × |
| OFF | ON | ○ | × | ○ | × |
| ON | ON | × | ○ | ○ | × |
| ... | | | | | |

931 — AIR CONDITIONER
932 — AUDIO
933 — SELECTED MICROPHONE

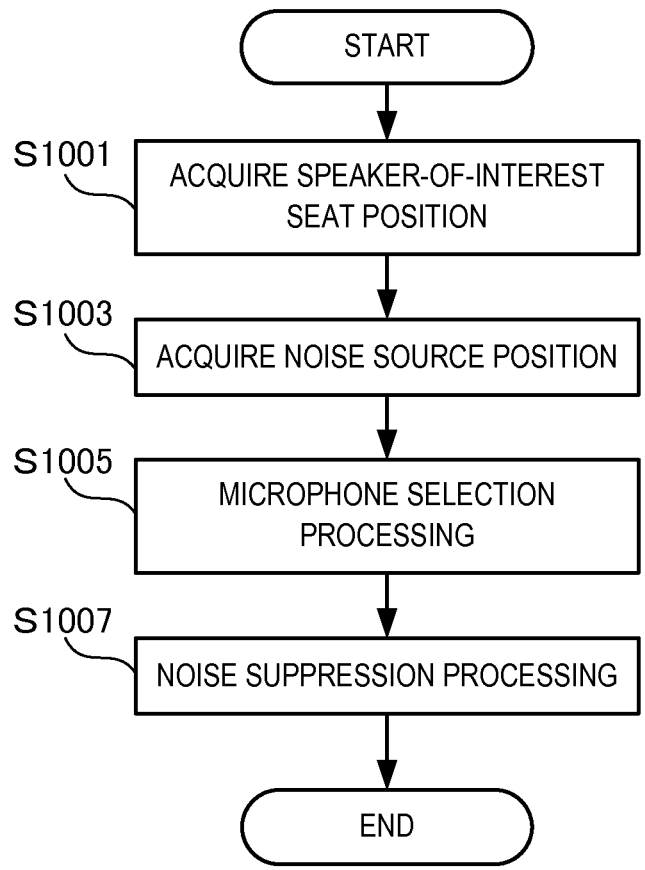
F I G. 10

1141

| NOISE FREQUENCY BAND | FREQUENCY BAND OF SPEAKER OF INTEREST | SELECTED MICROPHONE | | | | |
|---|---|---|---|---|---|---|
| | | 1 | 2 | 3 | 4 | ... |
| HIGH FREQUENCY BAND | HIGH FREQUENCY BAND | ○ | ○ | × | | |
| | MEDIUM FREQUENCY BAND | × | ○ | ○ | × | |
| MEDIUM FREQUENCY BAND | MEDIUM FREQUENCY BAND | ○ | × | ○ | × | |
| | LOW FREQUENCY BAND | × | ○ | × | ○ | |
| LOW FREQUENCY BAND | LOW FREQUENCY BAND | ○ | × | × | ○ | |
| | | × | ○ | × | × | |
| ... | | | | | | |

| SELECTED MICROPHONE PAIR 1501 | | ENHANCED SIGNAL 1502 | NOISE SUPPRESSION EFFECT 1503 | SELECTION / NONSELECTION 1504 |
|---|---|---|---|---|
| 1 | 2 | | | × |
| 2 | 3 | | | ○ |
| 3 | 4 | | | × |
| 1 | 3 | | | ○ |
| ... | ... | | | × |

| 1911 POSITION OF SPEAKER OF INTEREST | 1912 POSITION OF FIRST NOISE SOURCE | 1913 POSITION OF SECOND NOISE SOURCE | ... | 1914 POSITION OF nTH NOISE SOURCE | 1915 SELECTED MICROPHONE | | | | |
|---|---|---|---|---|---|---|---|---|---|
| | | | | | 1 | 2 | 3 | 4 | ... |
| | | | | | ○△ | ○ | | | |
| | | | | | ○ | ○ | | | |
| | | | | | ○ | | | | |
| | | | | | | △ | ○ | | |
| | | | | | | | △ | △ | |
| ... | | | | | | | | △ | |

| | 1921 | 1922 | 1923 | ... | 1924 | 1925 SELECTED MICROPHONE | | | | |
|---|---|---|---|---|---|---|---|---|---|---|
| 1703B | FREQUENCY BAND OF SPEAKER OF INTEREST | FREQUENCY BAND OF FIRST NOISE SOURCE | FREQUENCY BAND OF SECOND NOISE SOURCE | ... | FREQUENCY BAND OF nTH NOISE SOURCE | 1 | 2 | 3 | 4 | ... |
| | | | | | | ○ | ○ △ | | | |
| | | | | | | ○ △ | ○ | ○ | △ | |
| | | | | | | ○ △ □ | | △ | △ | |
| | ... | | | | | | | | □ | |

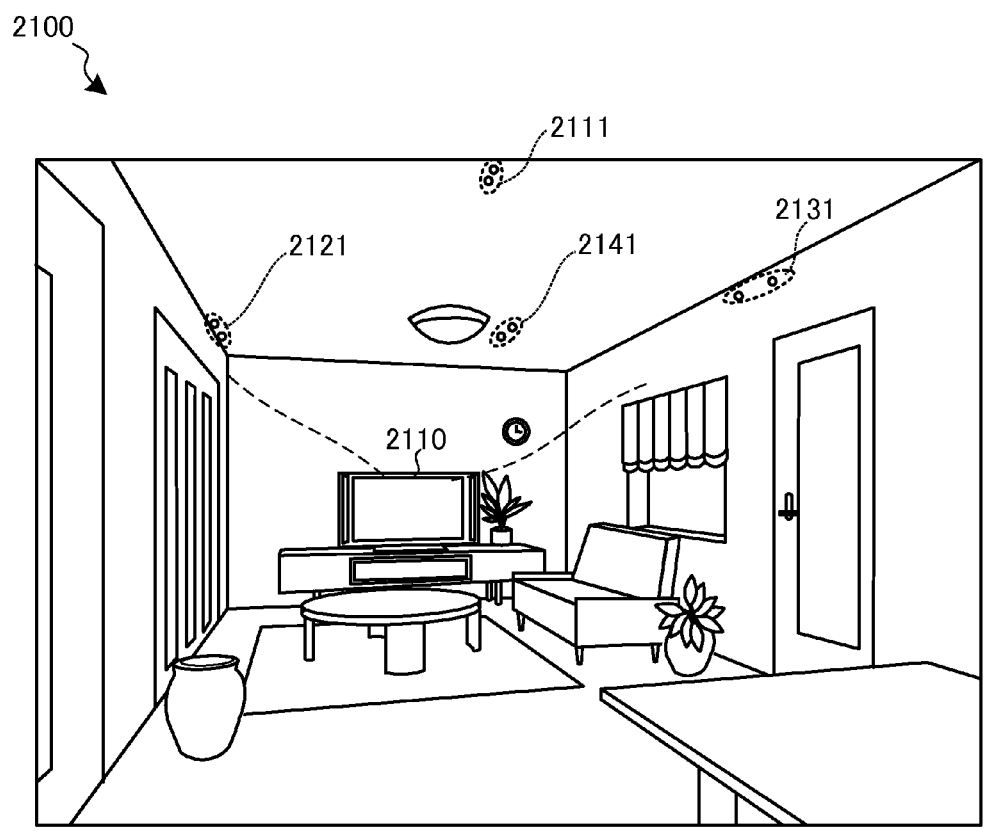
F I G. 21

SPEECH PROCESSING SYSTEM, SPEECH PROCESSING METHOD, SPEECH PROCESSING PROGRAM, VEHICLE INCLUDING SPEECH PROCESSING SYSTEM ON BOARD, AND MICROPHONE PLACING METHOD

This application is a National Stage Entry of PCT/JP2014/050654 filed on Jan. 16, 2014, which claims priority from Japanese Patent Application 2013-109006 filed on May 23, 2013, the contents of all of which are incorporated herein by reference, in their entirety.

TECHNICAL FIELD

The present invention relates to a noise suppression technique in an environment including a plurality of noise sources.

BACKGROUND ART

In the above technical field, patent literature 1 discloses a technique of suppressing noise using a microphone array in which a plurality of microphones are arranged in a lateral direction with respect to a passenger of a vehicle.

CITATION LIST

Patent Literature

Patent literature 1: Japanese Patent Laid-Open No. 2006-222969

SUMMARY OF THE INVENTION

Technical Problem

In the technique described in the above literature, however, for a plurality of noise sources spreading in the lateral direction with respect to the passenger who is a speaker of interest, it is necessary to individually consider noise suppression of the noise sources. Since a state in which the distances from the speaker of interest or noise sources to the plurality of microphones become equal occurs, noise suppression processing is complicated, and efficient noise suppression is impossible.

The present invention enables to provide a technique of solving the above-described problem.

Solution to Problem

One aspect of the present invention provides a speech processing system comprising:

a microphone array including a plurality of microphones, each of which inputs a sound mixture including speech of a speaker of interest and noise from a noise source region including a plurality of noise sources placed in a lateral direction with respect to the speaker of interest, and outputs a mixture signal including a speech signal and a noise signal, said plurality of microphones being arranged such that a difference between respective distances from said plurality of microphones to the speaker of interest becomes different from a difference between respective distances from said plurality of microphones to the noise source region; and a noise suppressor that suppresses the noise based on the mixture signals output from said plurality of microphones.

Another aspect of the present invention provides a speech processing system comprising:

a first microphone that is placed on a ceiling in a vehicle, inputs a sound mixture including noise and a voice of a passenger of the vehicle, and outputs a first mixture signal;

a second microphone that is placed on the ceiling in the vehicle at a front position in the vehicle with respect to said first microphone, inputs a sound mixture including the noise and the voice of the passenger of the vehicle, and outputs a second mixture signal; and a noise suppressor that outputs an enhanced speech signal based on the first mixture signal and the second mixture signal.

Still other aspect of the present invention provides a vehicle including the present speech processing system.

Still other aspect of the present invention provides a microphone placing method comprising arranging a plurality of microphones, each of which inputs a sound mixture including speech of a speaker of interest and noise from a noise source region including a plurality of noise sources placed in a lateral direction with respect to the speaker of interest, and outputs a mixture signal including a speech signal and a noise signal, such that a difference between respective distances from the plurality of microphones to the speaker of interest becomes different from a difference between respective distances from the plurality of microphones to the noise source region.

Still other aspect of the present invention provides a speech processing method comprising:

selecting microphones to output a mixture signal including a speech signal and a noise signal, out of a plurality of microphones, each of which inputs a sound mixture including speech of the speaker of interest and noise from a noise source region including a plurality of noise sources placed in a lateral direction with respect to a speaker of interest, and outputs the mixture signal, the plurality of microphones being arranged such that a difference between respective distances from the plurality of microphones to the speaker of interest becomes different from a difference between respective distances from the plurality of microphones to the noise source region; and suppressing the noise based on the mixture signals output from the selected microphones.

Still other aspect of the present invention provides a speech processing program for causing a computer to execute a method, comprising:

selecting microphones to output a mixture signal including a speech signal and a noise signal, out of a plurality of microphones, each of which inputs a sound mixture including speech of the speaker of interest and noise from a noise source region including a plurality of noise sources placed in a lateral direction with respect to a speaker of interest, and outputs the mixture signal, the plurality of microphones being arranged such that a difference between respective distances from the plurality of microphones to the speaker of interest becomes different from a difference between respective distances from the plurality of microphones to the noise source region; and suppressing the noise based on the mixture signals output from the selected microphones.

Advantageous Effects of Invention

According to the present invention, it is possible to efficiently perform noise suppression processing for a plurality of noise sources spreading in the lateral direction with respect to a speaker of interest.

BRIEF DESCRIPTION OF THE DRAWINGS

FIG. 3B is a view showing the outline of the speech processing system according to the second embodiment of the present invention;

FIG. 4 is a block diagram showing the arrangement of the speech processing system according to the second embodiment of the present invention;

FIG. 5 is a view showing the arrangement of a noise suppressor according to the second embodiment of the present invention;

FIG. 7 is a view showing the outline of a speech processing system according to the third embodiment of the present invention;

FIG. 9A is a view showing the arrangement of a microphone selection table according to the third embodiment of the present invention;

FIG. 9B is a view showing the arrangement of a microphone selection table according to the third embodiment of the present invention;

FIG. 9C is a view showing the arrangement of a microphone selection table according to the third embodiment of the present invention;

FIG. 10 is a flowchart showing the processing procedure of the speech processing apparatus according to the third embodiment of the present invention;

FIG. 12 is a view showing the arrangement of a microphone selection table according to the fourth embodiment of the present invention;

FIG. 15 is a view showing the arrangement of a microphone selection table according to the fifth embodiment of the present invention;

FIG. 19A is a view showing the arrangement of a microphone selection table according to the sixth embodiment of the present invention;

FIG. 19B is a view showing the arrangement of a microphone selection table according to the sixth embodiment of the present invention;

FIG. 21 is a view showing the outline of a speech processing system according to the eighth embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
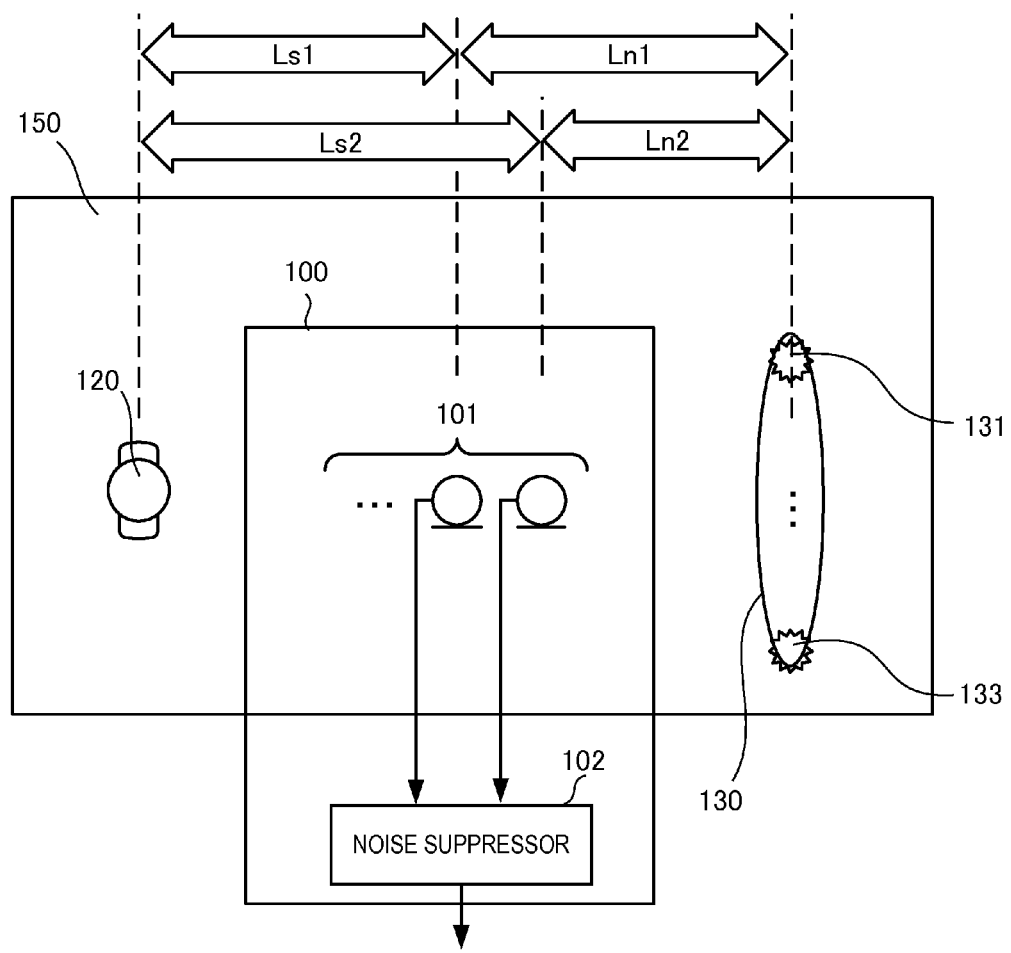
FIG. 1 is a block diagram showing the arrangement of a speech processing system according to the first embodiment of the present invention.

A speech processing system 100 according to the first embodiment of the present invention will be described with reference to FIG. 1. FIG. 1 is a view showing an environment 150 with a plurality of noise sources viewed from above the head of a speaker 120 of interest. The speech processing system 100 is a system that suppresses noise in the environment 150.

As shown in FIG. 1, the speech processing system 100 includes a microphone array 101, and a noise suppressor 102. The microphone array 101 is formed from a plurality of microphones each of which inputs a sound mixture including noise from a noise source region 130 including a plurality of noise sources 131 to 133 placed in the lateral direction with respect to the speaker 120 of interest and the speech of the speaker 120 of interest and outputs a mixture signal including the speech signal and the noise signal. The microphone array 101 is formed from a plurality of microphones which are arranged such that the difference (Ls1−Ls2) between respective distances (Ls1 and Ls2) from the plurality of microphones to the speaker 120 of interest becomes different from the difference (Ln1−Ln2) between respective distances (Ln1 and Ln2) from the plurality of microphones to the noise source region 130. The noise suppressor 102 suppresses noise based on mixture signals output from the plurality of microphones.

According to this embodiment, it is possible to efficiently perform noise suppression processing for the plurality of noise sources spreading in the lateral direction with respect to the speaker of interest.

Second Embodiment

A speech processing system according to the second embodiment of the present invention will be described next. In the speech processing system according to this embodiment, a microphone array is arranged on a ceiling in front of a passenger in a direction to connect a noise source and the passenger. The microphone array is formed from two microphones each of which inputs speech of a passenger of a vehicle and noise from a plurality of loudspeakers or a plurality of outlets of an air conditioner which are noise sources placed in the lateral direction with respect to the passenger on the front side of the vehicle and outputs a mixture signal. Noise is suppressed based on mixture signals output from the two microphones. That is, a description will be made using a vehicle including the speech processing system according to this embodiment on board as an example.

<<Speech Processing System>>

A speech processing system 200 according to this embodiment will be described with reference to FIGS. 2 to 4.

(Arrangement)

Figure 2:
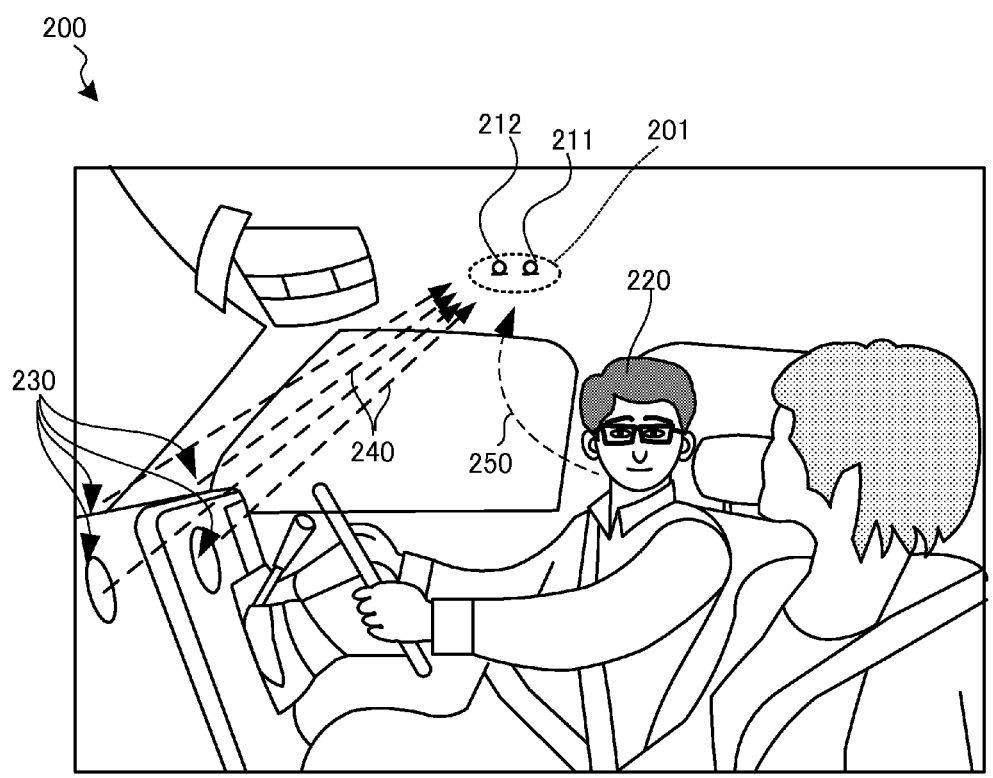
FIG. 2 is a view showing an arrangement of a speech processing system according to the second embodiment of the present invention.

FIG. 2 is a view showing an arrangement of the speech processing system 200 according to this embodiment. In this embodiment, the speech processing system 200 is a system that suppresses noise mixed with speech of a passenger as a speaker of interest by a microphone array arranged in a vehicle.

Referring to FIG. 2, the driver is a speaker 220 of interest, and loudspeakers and air conditioner outlets form a noise source region 230 on the front side in the vehicle. A microphone array 201 includes a first microphone 211 and second microphone 212 which are arranged on a ceiling between the speaker 220 of interest and the noise source region 230 in a direction to connect the speaker 220 of interest and the noise source region 230. The first microphone 211 is closer to the speaker 220 of interest. Hence, the arrival time of speech 250 of the speaker 220 of interest at the first microphone 211 is earlier than that for the second microphone 212, and a large volume is input. On the other hand, the second microphone 212 is closer to the noise source region 230. Hence, the arrival time of noise 240 from the noise source region 230 at the second microphone 212 is earlier than that for the first microphone 211, and a large volume is input. As described above, in the sound mixture of the speech 250 and the noise 240 input to the first microphone 211 and the sound mixture of the speech 250 and the noise 240 input to the second microphone 212, both the speech and noise are different in the arrival time and volume, and the mixture ratio changes. For this reason, a noise suppressor that inputs a first mixture signal and a second mixture signal output from the first microphone 211 and the second microphone 212, respectively, efficiently suppresses the noise.

(Outline of System of Assumed Technique)

Figure 3A:
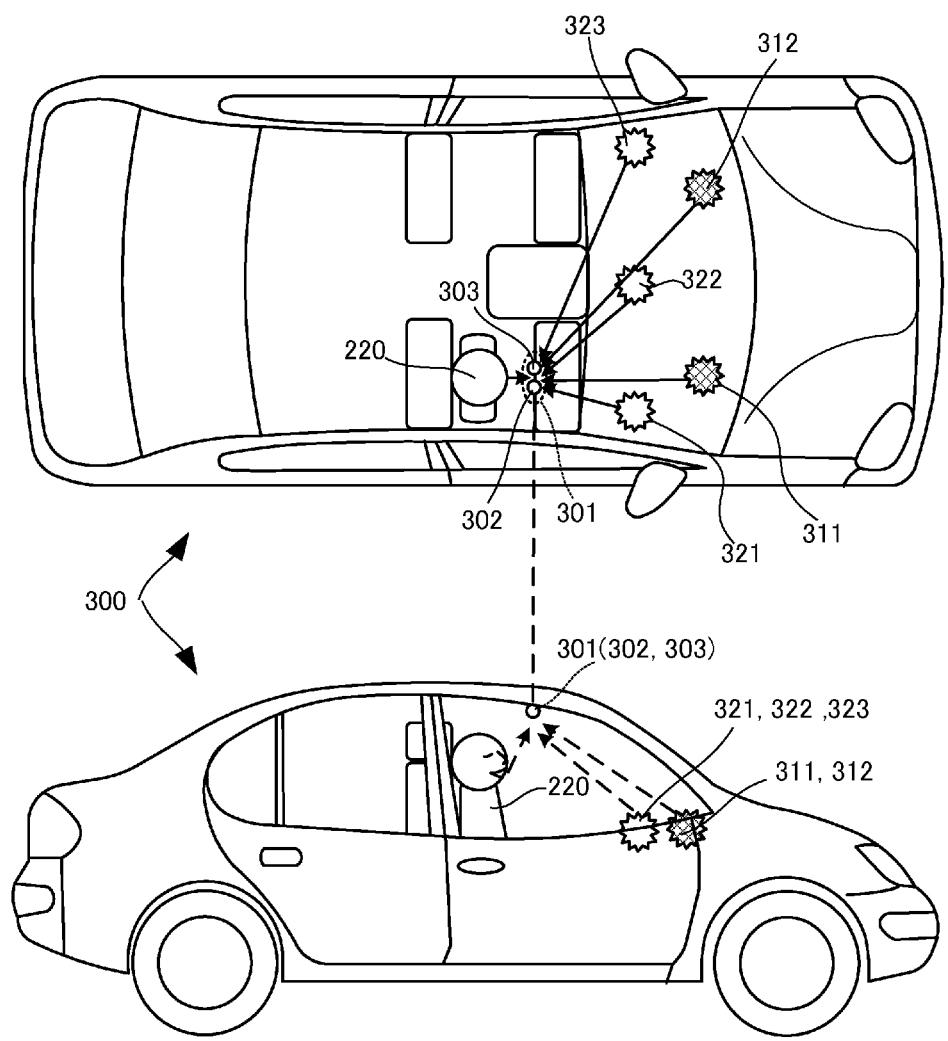
FIG. 3A is a view showing the outline of a speech processing system according to an assumed technique.

To clarify the effects of the speech processing system 200 according to this embodiment, the outline of a speech processing system 300 according to an assumed technique will be described first. FIG. 3A is a view showing the outline of the speech processing system 300 according to the assumed technique.

In FIG. 3A, two, right and left loudspeakers 311 and 312 and three, right, middle, and left air conditioner outlets 321 to 323 exist as a plurality of noise sources in front of the speaker 220 of interest. Referring to FIG. 3A, a microphone array 301 is located between the speaker 220 of interest and the plurality of noise sources, and a first microphone 302 and a second microphone 303 are arranged almost in parallel to the lateral direction in which the plurality of noise sources are placed. According to the arrangement of the speaker 220 of interest, the plurality of noise sources, and the microphone array 301 as shown in FIG. 3A, the following problems arise.

As is apparent from the upper view of FIG. 3A, as for the differences in the arrival time and volume of noise input to the first microphone 302 and the second microphone 303, the difference in the distance from the noise source to the microphone changes between the noise from the two, right and left loudspeakers 311 and 312. In addition, the difference in the distance from the noise source to the microphone changes between the noise from the three, right, middle, and left air conditioner outlets 321 to 323. Hence, noise suppression needs to be considered assuming that the two, right and left loudspeakers 311 and 312 and the three, right, middle, and left air conditioner outlets 321 to 323 as different noise sources.

In addition, as is apparent from the upper and lower views of FIG. 3A, the first microphone 302 and the second microphone 303 are almost equidistant from the speaker 220 of interest. For this reason, the arrival times and volumes of speech of the speaker 220 of interest are almost the same between the first microphone 302 and the second microphone 303. Additionally, as is apparent from the lower view of FIG. 3A, the first microphone 302 and the second microphone 303 are also almost equidistant from the noise sources formed from the loudspeakers 311 and 312. For this reason, the arrival times and volumes of noise from the noise source formed from the loudspeakers 311 and 312 are almost the same between the first microphone 302 and the second microphone 303. Hence, the speech and noise are input to the first microphone 302 and the second microphone 303 in the same arrival time and volume. As a result, when the noise from the noise source formed from the loudspeakers 311 and 312 is suppressed, the speech of the speaker 220 of interest is suppressed. On the other hand, when the speech of the speaker 220 of interest is enhanced, the noise from the noise source formed from the loudspeakers 311 and 312 is picked up as well. This leads to inefficient noise suppression.

(Outline of this System)

As compared to the assumed technique, the microphone array arrangement in the speech processing system 200 according to this embodiment enables efficient noise suppression. FIG. 3B is a view showing the outline of the speech processing system 200 according to this embodiment. This is a view showing the effect of the arrangement shown in FIG. 2. Note that the same reference numerals as in FIG. 2 denote the same constituent elements in FIG. 3B.

In FIG. 3B, a noise source region 310 of two, left and right loudspeakers and a noise source region 320 of three, left, right, and middle air conditioner outlets are illustrated as the noise source region 230 in FIG. 2 that is formed by the noise source group placed in the lateral direction with respect to the speaker 220 of interest. The first microphone 211 and the second microphone 212 of the microphone array 201 are arranged in a direction in which the microphones have almost the same distance difference to the noise sources. Hence, in the noise source region 310 of the two, left and right loudspeakers that are noise sources of the same type, the distances from the loudspeakers to the first microphone 211 and the distances from the loudspeakers to the second microphone 212 almost equal. The placement position of the microphone array 201 in the forward/backward direction of the vehicle and the tilt of the placement plane of the microphone array are preferably adjusted so as to decrease the differences between the distances from the noise sources to the first microphone 211 and the distances from the noise sources to the second microphone 212. In this case, the differences between the distances from the loudspeakers to the first microphone 211 and the distances from the loudspeakers to the second microphone 212 also almost equal.

This also applies to the outputs in the noise source region 320 of the three, left, right, and middle air conditioner outlets. The noise source region 310 of the two, left and right loudspeakers can thus be regarded not as individual noise sources but as one noise source region. The noise source region 320 of the three, left, right, and middle air conditioner outlets can also be regarded as one noise source region. Hence, it can be assumed that two noise source regions exist in FIG. 3B. If the noise source region 310 of the two, left and right loudspeakers and the noise source region 320 of the three, left, right, and middle air conditioner outlets are in close vicinity, the noise source region 310 and the noise source region 320 can be regarded as one noise source region.

In addition, as is apparent from the upper and lower views of FIG. 3B, the first microphone 211 and the second microphone 212 have a distance difference almost equal to the interval between them with respect to the speaker 220 of interest. The arrival times and volumes of speech of the speaker 220 of interest change between the first microphone 211 and the second microphone 212. Additionally, as is apparent from the lower view of FIG. 3B, the difference between the distance from the first microphone 211 to the speaker 220 of interest and the distance from the second microphone 211 to the speaker 220 of interest is different from the difference between the distance from the first microphone 211 to the noise source region and the distance from the second microphone 211 to the noise source region. That is, the differences in the arrival time and volume of the speech of the speaker 220 of interest between the first microphone 211 and the second microphone 212 are different from the differences in the arrival time and volume of the noise from the noise source region between the first microphone 211 and the second microphone 212. Hence, the speech and noise are input to the first microphone 211 and the second microphone 212 at different mixture ratios. As a result, noise suppression by the noise suppressor can efficiently be performed in accordance with the differences in the input and mixture ratio.

As described above, in this specification, the region of a noise source group formed from a plurality of noise sources is handled as one noise source region. In a method of placing the plurality of microphones of the microphone array, the plurality of microphones, each of which inputs a sound mixture including speech of the speaker of interest and noise from the noise source region including a plurality of noise sources placed in the lateral direction with respect to the speaker of interest, and outputs a mixture signal including the speech signal and the noise signal, are arranged such that the difference between the respective distances from the plurality of microphones to the speaker of interest becomes different from the difference between the respective distances from the plurality of microphones to the noise source region. As for the arrangement of the plurality of microphones of the microphone array, they need only be located on a line that passes through points acquired by projecting the speaker of interest and one point in the noise source region on the plane (ceiling or door) on which the microphone array is placed. Alternatively, the microphones need only be located on a line that connects, in a shortest distance, a region and a point acquired by projecting the noise source region and the speaker of interest on the plane (ceiling or door) on which the microphone array is placed. Otherwise, the microphones need only be located on a line that connects points acquired by projecting the center of the noise source region and the speaker of interest on the plane (ceiling or door) on which the microphone array is placed. Note that "on a line" also includes a position near the line. The interval between microphones in the microphone array is, for example, less than 10 cm and preferably falls within the range of about 2 cm to 4 cm.

(Block Arrangement)

FIG. 4 is a block diagram showing the arrangement of the speech processing system 200 according to this embodiment. Note that the same reference numerals as in FIG. 2 denote the same constituent elements in FIG. 4, and a description thereof will be omitted.

A first mixture signal (line 404) output from the first microphone 211 of the microphone array 201 and a second mixture signal (line 405) output from the second microphone 212 are input to a noise suppressor 430 (see FIG. 5) of a speech processing apparatus 450. An enhanced speech signal (line 431) that is the output signal from the noise suppressor 430 is further processed by a controller 440. Although not illustrated, the controller 440 may perform speech recognition processing, speech reproduction processing, or the like.

In addition, the controller 440 controls speech processing of the speech processing apparatus 450. In this embodiment, for example, if the passenger instructs to output speech or music from the loudspeakers or instructs to activate the air conditioner, noise suppression using the microphone array 201 is activated. Hence, if speech output from the loudspeakers or the air conditioner is off, control may be done to use only the first microphone 211 or perform suppression processing of noise in the vehicle different from this embodiment.

Note that the controller 440 may have a hardware arrangement such as a logic array, a software configuration for executing a program using a RAM by a CPU, or a firmware arrangement that combines them.

<<Noise Suppressor>>

FIG. 5 is a view showing the arrangement of the noise suppressor 430 according to this embodiment.

The noise suppressor 430 includes a subtracter 501 that subtracts, from a first mixture signal X1, an estimated noise signal Y1 estimated to be included in the first mixture signal X1. The noise suppressor 430 also includes a subtracter 503 that subtracts, from a second mixture signal X2, an estimated speech signal Y2 estimated to be included in the second mixture signal X2. The noise suppressor 430 also includes an adaptive filter NF 502 serving as an estimated noise signal generator that generates the estimated noise signal Y1 from an enhanced noise signal E2 that is the output signal of the subtracter 503. The noise suppressor 430 also includes an adaptive filter XF 504 serving as an estimated speech signal generator that generates the estimated speech signal Y2 from an enhanced speech signal E1 that is the output signal of the subtracter 501. A detailed example of the adaptive filter XF 504 is described in International Publication No. 2005/024787. The adaptive filter XF 504 prevents the subtracter 501 from erroneously removing the speech signal of the speaker 220 of interest input to the second microphone 212 from the first mixture signal X1.

With this arrangement, the subtracter 501 subtracts the estimated noise signal Y1 from the first mixture signal X1 transmitted from the first microphone 211 and outputs the enhanced speech signal E1.

The estimated noise signal Y1 is generated by processing the enhanced noise signal E2 by the adaptive filter NF 502 using a parameter that changes based on the enhanced speech signal E1. The enhanced noise signal E2 is a signal obtained by causing the subtracter 503 to subtract the estimated speech signal Y2 from the second mixture signal X2 transmitted from the second microphone 212 via a signal line. The estimated speech signal Y2 is generated by processing the enhanced speech signal E1 by the adaptive filter XF 504 using a parameter that changes based on the enhanced noise signal E2.

Note that the noise suppressor 430 can be any one of an analog circuit, a digital circuit, and a mixture thereof. When the noise suppressor 430 is an analog circuit, the enhanced speech signal E1 is converted into a digital signal by an A/D converter if it is used for digital control. On the other hand, when the noise suppressor 430 is a digital circuit, a signal from the microphone is converted into a digital signal by an A/D converter before input to the noise suppressor 430. If both an analog circuit and a digital circuit coexist, for example, the subtracter 501 or 503 can be formed from an analog circuit, and the adaptive filter NF 502 or the adaptive filter XF 504 can be formed from an analog circuit controlled by a digital circuit. The noise suppressor 430 shown in FIG. 5 is one of circuit examples suitable for this embodiment. An existing circuit that subtracts the estimated noise signal from the mixture signal and outputs the enhanced speech signal is usable. That is, noise suppression can efficiently be performed by the characteristic arrangement of the first microphone 211 and the second microphone 212 of the microphone array 201 according to this embodiment. For example, the adaptive filter XF 504 shown in FIG. 5 can be replaced with a circuit that outputs a predetermined level to filter diffused speech. In addition, the subtracter 501 and/or 503 can be replaced with an integrator by representing the estimated noise signal Y1 or the estimated speech signal Y2 as a coefficient to multiply the first mixture signal X1 or the second mixture signal X2. In addition, delay-and-sum array processing or delay-and-difference array processing is performed for the first mixture signal X1 or the second mixture signal X2, and the processed signal may alternatively be used as an input to the noise suppressor 430.

<<Another Arrangement of Speech Processing System>>

Figure 6A:
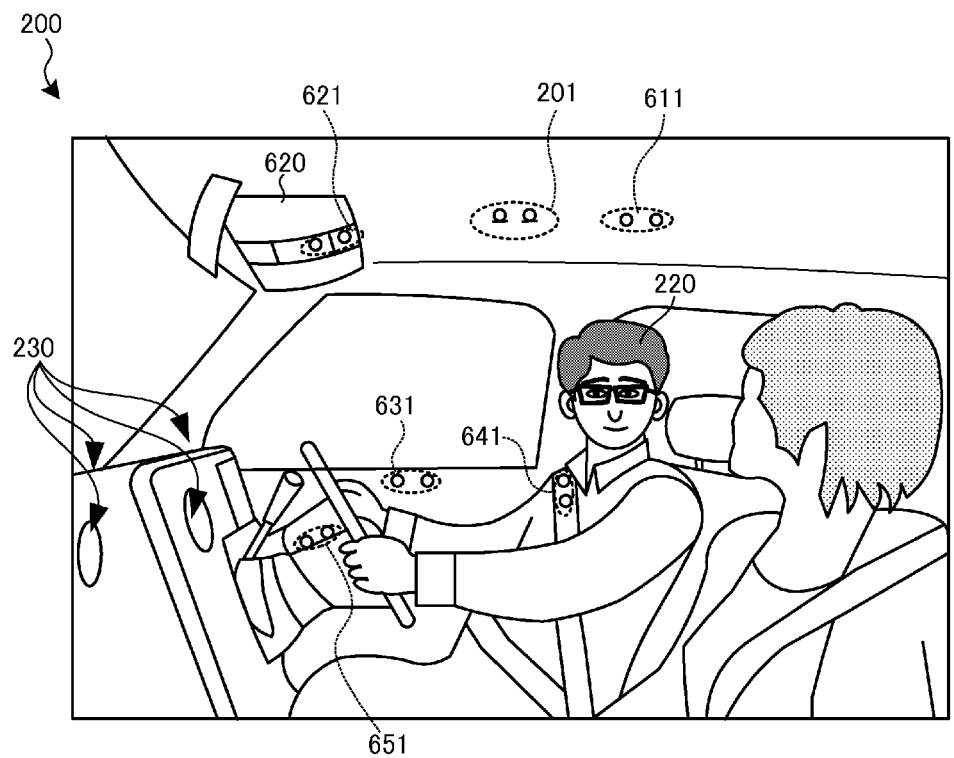
FIG. 6A is a view showing another arrangement of the speech processing system according to the second embodiment of the present invention.

FIG. 6A is a view showing another arrangement of the speech processing system 200 according to this embodiment. FIG. 6A shows several examples of microphone arrays arranged at positions different from FIG. 2. However, the arrangements are not limited to these examples. Efficient noise suppression according to this embodiment can be performed if the two microphones of the microphone array are arranged such that the difference between the distances from the microphones to the speaker of interest becomes different from the difference between the distances from the microphones to the noise source region. Note that the same reference numerals as in FIG. 2 denote the same constituent elements, and a description thereof will be omitted.

In a microphone array 611, two microphones are arranged in the direction to connect the speaker 220 of interest who is the driver and the noise source region 230 and arranged on the ceiling above the speaker 220 of interest or slightly behind. In a microphone array 621, two microphones are arranged in the direction to connect the speaker 220 of interest who is the driver and the noise source region 230 and arranged on a sun visor 620 (see FIG. 6B) or on the ceiling above the sun visor 620 (see FIG. 6C). In a microphone array 631, two microphones are arranged in the direction to connect the speaker 220 of interest who is the driver and the noise source region 230 and arranged on a door. In a microphone array 641, two microphones are arranged in the direction to connect the speaker 220 of interest who is the driver and the noise source region 230 and arranged on the seat belt of the speaker 220 of interest.

In a microphone array 651, two microphones are arranged in the direction to connect the speaker 220 of interest who is the driver and the noise source region 230 and arranged on the column cover of the steering wheel.

(Sun Visor)

Figure 6B:
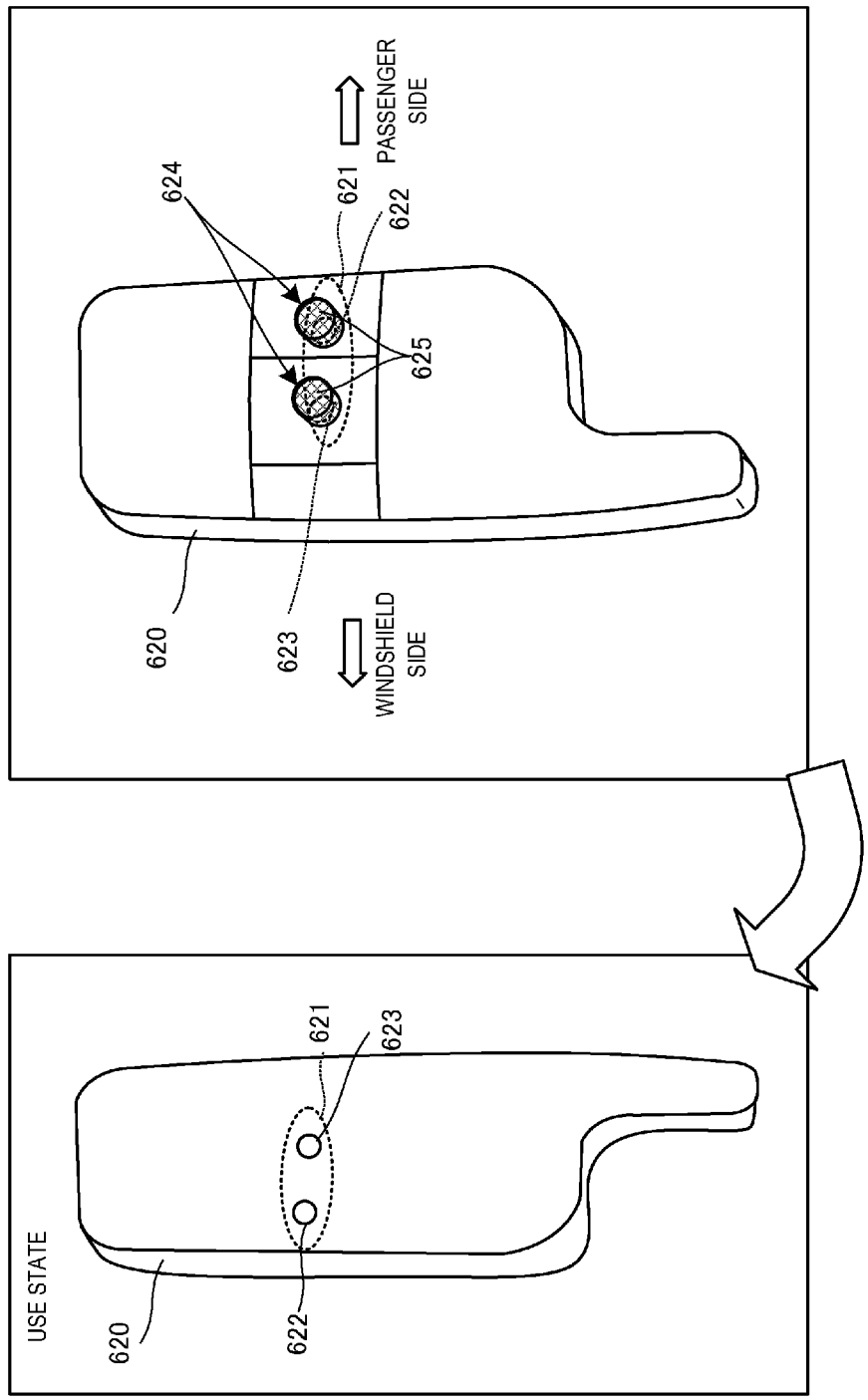
FIG. 6B is a view showing an arrangement of a sun visor according to the second embodiment of the present invention.

FIG. 6B is a view showing an arrangement of the sun visor 620 according to this embodiment. FIG. 6B illustrates a case where the sun visor 620 is used and a case where the sun visor 620 is not used. In FIG. 6B, the drawing surface corresponds to the ceiling of the vehicle.

The left view of FIG. 6B shows the case where the sun visor 620 is used. A first microphone 622 and a second microphone 623 included in the microphone array 621 are arranged on the sun visor 620.

The right view of FIG. 6B shows the case where the sun visor 620 is not used (the sun visor 620 is in contact with the ceiling in the vehicle). To prevent the sun visor 620 from blocking a sound to the first microphone 622 and the second microphone 623 independently of the use state of the sun visor 620, portions (portions of the sun visor 620) overlapping the first microphone 622 and the second microphone 623 are processed to pass a sound. For example, holes 624 are formed in portions of the sun visor 620 overlapping the first microphone 622 and the second microphone 623. Each hole 624 is then filled with a material 625 that readily passes a sound and blocks light, like a sponge material.

Figure 6C:
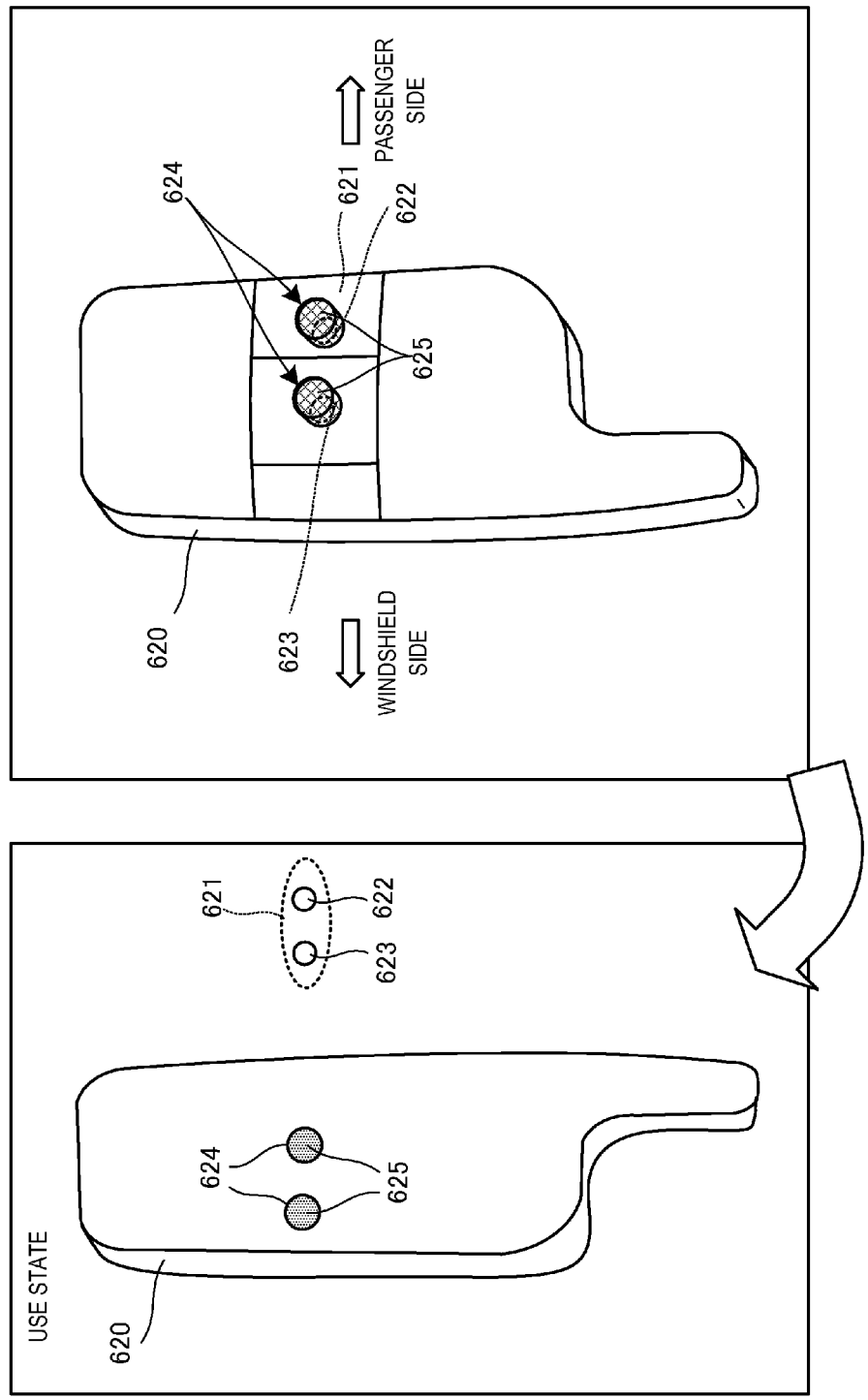
FIG. 6C is a view showing another arrangement of the sun visor according to the second embodiment of the present invention.

Note that the positions of the two microphones are reversed between the case where the sun visor 620 is used and the case where the sun visor 620 is not used. The microphone close to mainly the passenger who is the speaker of interest and the microphone close to mainly the noise source change the places with each other. Hence, connection between the microphones and the input of the noise suppressor 430 is preferably switched by detecting the position of the sun visor 620. When the microphone array 621 is arranged on the ceiling above the sun visor 620, as shown in FIG. 6C, connection between the microphones and the input of the noise suppressor 430 need not be switched independently of the use state of the sun visor 620.

According to this embodiment, it is possible to efficiently perform noise suppression processing for a plurality of noise sources such as loudspeakers or air conditioner outlets spreading in the lateral direction with respect to the speaker of interest relative to the speech of the speaker of interest.

Third Embodiment

A speech processing system according to the third embodiment of the present invention will be described next. The speech processing system according to this embodiment is different from the second embodiment in that a microphone array includes three or more microphones, and appropriate microphones are selected and used in accordance with the type of a driven noise source or the positions of the speaker of interest and the noise source, which are conditions of the speaker of interest and the noise source. The rest of the components and operations is the same as in the second embodiment. Hence, the same reference numerals denote the same components and operations, and a detailed description thereof will be omitted.

<<Outline of Speech Processing System>>

FIG. 7 is a view showing the outline of a speech processing system 700 according to this embodiment. Note that the same reference numerals as in FIG. 3B denote the same constituent elements in FIG. 7, and a description thereof will be omitted.

A microphone array 701 is formed from four microphones juxtaposed and arranged on the ceiling such that the distances up to a speaker 220 of interest and the distances up to noise source regions 310 and 320 change between them. A microphone array 731 is formed from three microphones juxtaposed and arranged on a door such that the distances up to the speaker 220 of interest and the distances up to the noise source regions 310 and 320 change between them. Note that as shown in FIG. 6A, the placement positions of the microphone arrays are not limited to those shown in FIG. 7.

In this embodiment, two microphones appropriate for efficient noise suppression are selected from the four microphones or three microphones and used in correspondence with the position of the speaker 220 of interest or the positions of the noise source regions 310 and 320. Note that in this embodiment, since the positions of the noise source regions 310 and 320 are fixed, two microphones are selected in correspondence with the position of the speaker 220 of interest, which is changed by moving the seat back and forth.

<<Speech Processing Apparatus>>

Figure 8:
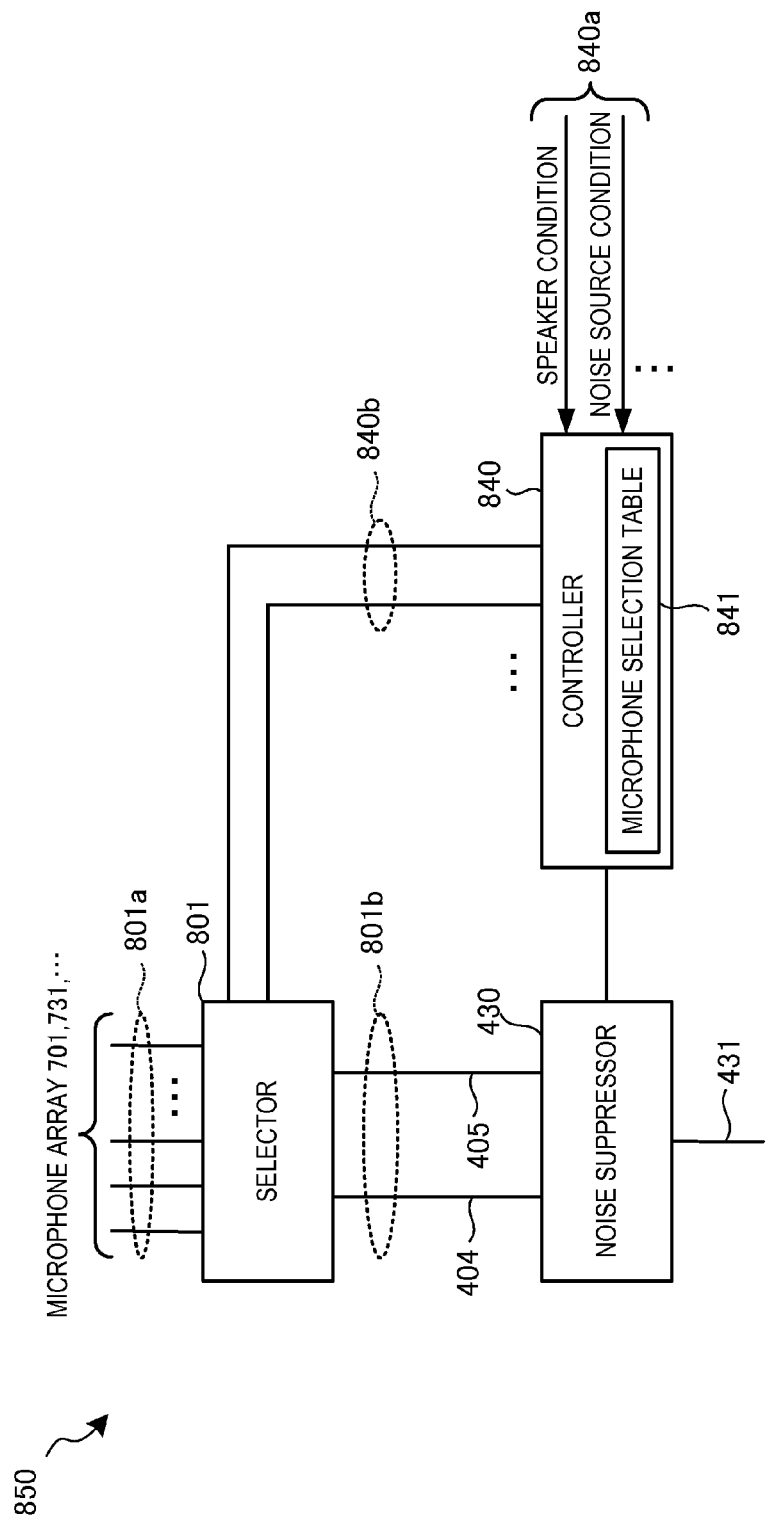
FIG. 8 is a block diagram showing the arrangement of a speech processing apparatus according to the third embodiment of the present invention.

FIG. 8 is a block diagram showing the arrangement of a speech processing apparatus 850 according to this embodiment. Note that the same reference numerals as in FIG. 2 or 4 denote the same constituent elements in FIG. 8, and a description thereof will be omitted.

A selector 801 selects two outputs 801b to be input to a noise suppressor 430 from outputs 801a from the plurality of microphones of the microphone array 701 or 731. A controller 840 includes a microphone selection table 841 (see FIGS. 9A to 9C), and outputs selection signals 840b to the selector 801 based on conditions 840a of the speaker of interest and the noise source, for example, the type of the driven noise source or the noise source position or seat position corresponding to the position of the speaker of interest. Note that signal selection by the selector 801 can be performed by the gate of each signal of the selection signals 840b or based on the binary values of the selection signals 840b.

In addition, the controller 840 controls noise suppression by the speech processing apparatus 850. For example, if the passenger instructs to output speech or music from the loudspeakers or instructs to activate the air conditioner, noise suppression using two microphones of the microphone array 701 or 731 is activated. Hence, if speech output from the loudspeakers or the air conditioner is off, control may be done to use only one microphone or perform suppression processing of noise in the vehicle different from this embodiment.

In addition, for noise from another noise source such as noise coming from outside of the vehicle through an open window, appropriate microphones may be selected in association with the position of the speaker 220 of interest. In this case, appropriate microphones are selected by detecting a passenger's instruction to open the window or opening of the window.

Note that in FIG. 8, the selector 801 selects the outputs 801a from the microphones of the microphone array 701 or 731. However, only appropriate microphones to be used may be selected and operated. The position of the speaker of interest may be predicted by detecting the seat position, or the generation position of the speech of the speaker of interest may actually be detected by the microphone array. The positions of noise sources such as the loudspeakers and the air conditioner are fixed. However, for a new noise source such as noise from a window, the direction (position) of the noise source may be detected by the microphone array.

(Microphone Selection Table)

FIG. 9A is a view showing the arrangement of a microphone selection table 841A according to this embodiment. The microphone selection table 841A is an example of the microphone selection table 841 shown in FIG. 8. The microphone selection table 841A is used by the controller 840 to select a mixture signal output from a microphone in correspondence with the position of the speaker of interest or the position of the noise source.

The microphone selection table 841A stores two microphones 913 to be selected in association with a combination of a speaker-of-interest seat position 911 of the speaker of interest and a noise source position 912. Note that in the noise source regions 310 and 320, the noise source position 912 is fixed. When the window is opened/closed, the noise source position 912 changes.

FIG. 9B is a view showing the arrangement of a microphone selection table 841B according to this embodiment. The microphone selection table 841B is another example of the microphone selection table 841 shown in FIG. 8. The microphone selection table 841B is used by the controller 840 to select a mixture signal output from a microphone in correspondence with the position of the speaker of interest or the position of the noise source.

The microphone selection table 841B stores a microphone position 922, a speaker-of-interest seat position 923, and a distance 924 between the speaker of interest and the microphone in association with a microphone ID 921. The microphone selection table 841B also stores a noise source position 925 and a distance 926 between the noise source and the microphone in association with the microphone ID 921. In association with the microphone ID 921, the microphone selection table 841B selects a combination of two appropriate microphones based on the relationship between the distance 924 from the speaker of interest to the microphone and the distance 926 from the noise source to the microphone. When selecting the two microphones, a combination appropriate for noise suppression is selected based on the distance between the selected microphones, the difference in the distance from the speaker of interest to the noise source between the selected microphones, and the like.

FIG. 9C is a view showing the arrangement of a microphone selection table 841C according to this embodiment. The microphone selection table 841C is still another example of the microphone selection table 841 shown in FIG. 8. The microphone selection table 841C is used by the controller 840 to select a mixture signal output from a microphone in correspondence with the type of a driven noise source.

In association with a combination of an on/off state 931 of the air conditioner and an on/off state 932 of an audio, the microphone selection table 841C selects a combination of two appropriate microphones decided in advance in accordance with noise generated from a noise source. When selecting the two microphones, a combination appropriate for noise suppression is selected based on, for example, the frequency band of noise from a noise source region. Note that each noise source type may be weighted or given a noise suppression priority order in consideration of the influence on speech.

Note that the microphone selection table is not limited to the three examples. Any algorithm configured to select two microphones appropriate for noise suppression is usable.

<<Processing Procedure of Speech Processing Apparatus>>

FIG. 10 is a flowchart showing the processing procedure of the speech processing apparatus 850 according to this embodiment. This flowchart is executed by the CPU of the speech processing apparatus 850 using a RAM to implement the functional components shown in FIG. 8.

In step S1001, the speech processing apparatus 850 acquires the seat position of the speaker of interest. In step S1003, the speech processing apparatus 850 acquires the position of a noise source that generates noise to be suppressed. In step S1005, the speech processing apparatus 850 selects microphones (or output signals) based on the seat position of the speaker of interest and the position of the noise source. In step S1007, the speech processing apparatus 850 executes noise suppression processing using the noise suppressor 430.

According to this embodiment, appropriate microphones are used in accordance with the type of a driven noise source or the positions of the speaker of interest and the noise source, which are conditions of the speaker of interest and the noise source. It is therefore possible to more appropriately perform noise suppression processing for the speech of the speaker of interest.

Fourth Embodiment

A speech processing system according to the fourth embodiment of the present invention will be described next. The speech processing system according to this embodiment is different from the third embodiment in that appropriate microphones are selected from the microphone array and used in accordance with the frequency bands of the speaker of interest and a noise source, which are conditions of the speaker of interest and the noise source. The rest of the components and operations is the same as in the third embodiment. Hence, the same reference numerals denote the same components and operations, and a detailed description thereof will be omitted. Note that use microphone selection based on the frequency bands according to this embodiment can be combined with use microphone selection based on the position of the speaker of interest and the noise source according to the third embodiment.

<<Speech Processing Apparatus>>

Figure 11:
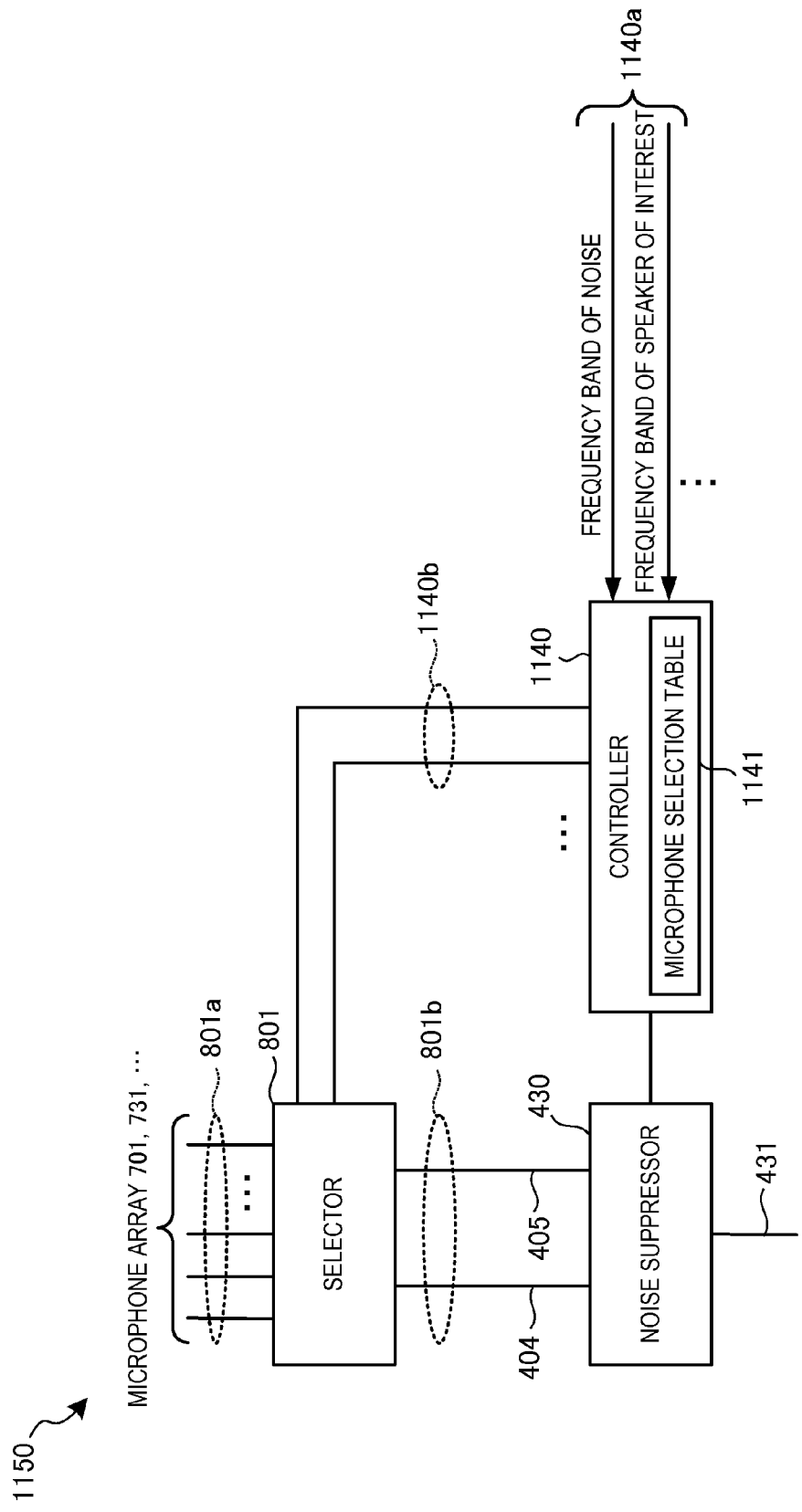
FIG. 11 is a block diagram showing the arrangement of a speech processing apparatus according to the fourth embodiment of the present invention.

FIG. 11 is a block diagram showing the arrangement of a speech processing apparatus 1150 according to this embodiment. Note that the same reference numerals as in FIG. 8 denote the same functional components in FIG. 11, and a description thereof will be omitted.

A controller 1140 includes a microphone selection table 1141 (see FIG. 12), and outputs selection signals 1140b to a selector 801 based on frequency bands 1140a of the speech of the speaker of interest and noise from a noise source. Note that signal selection by the selector 801 can be performed by the gate of each signal of the selection signals 1140b or based on the binary values of the selection signals 1140b.

In addition, the controller 1140 controls noise suppression by the speech processing apparatus 1150. For example, if the passenger instructs to output speech or music from the loudspeakers or instructs to activate the air conditioner, noise suppression using two microphones of a microphone array 701 or 731 is activated. Hence, if speech output from the loudspeakers or the air conditioner is off, control may be done to use only one microphone or perform suppression processing of noise in the vehicle different from this embodiment.

In addition, for noise from another noise source such as noise coming from outside of the vehicle through an open window, appropriate microphones may be selected in association with the position of a speaker 220 of interest. In this case, appropriate microphones are selected by detecting a passenger's instruction to open the window or opening of the window.

Note that in FIG. 11, the selector 801 selects outputs 801a from the microphones of the microphone array 701 or 731. However, only appropriate microphones to be used may be selected and operated. The frequency bands may be detected by a frequency detector or stored in advance in correspondence with the type of a noise source or the identifier of the speaker of interest.

(Microphone Selection Table)

FIG. 12 is a view showing the arrangement of the microphone selection table 1141 according to this embodiment. The microphone selection table 1141 is used by the controller 1140 to select a mixture signal output from a microphone in correspondence with the frequency band of the speech of the speaker of interest or the frequency band from the noise source.

The microphone selection table 1141 stores two microphones 1203 to be selected in association with a combination of a frequency band 1201 of noise generated from the noise source and a frequency band 1202 of the speech of the speaker of interest. Note that in noise source regions 310 and 320, the frequency band of noise from each noise source is known.

<<Processing Procedure of Speech Processing Apparatus>>

Figure 13:
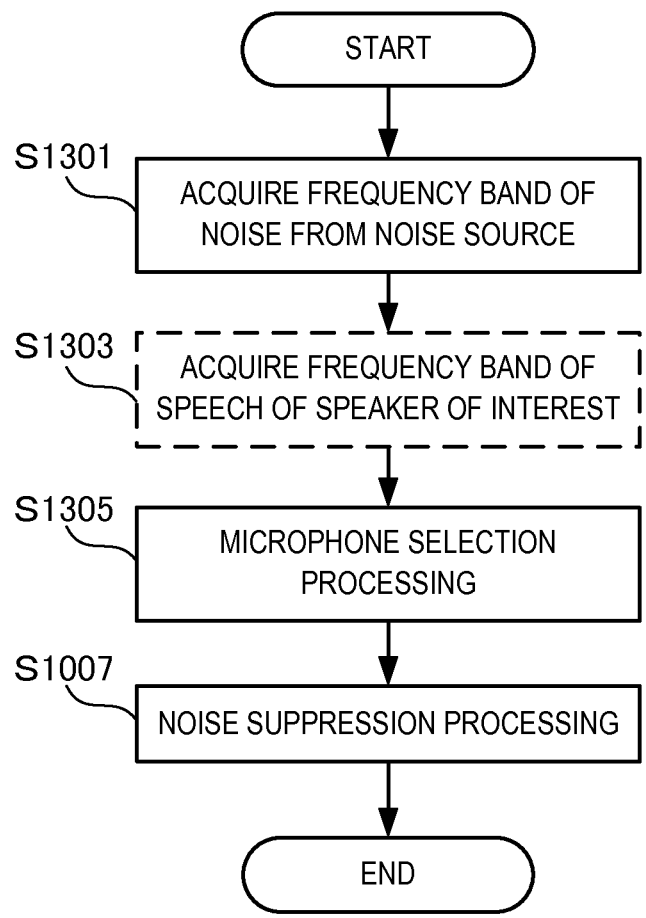
FIG. 13 is a flowchart showing the processing procedure of the speech processing apparatus according to the fourth embodiment of the present invention.

FIG. 13 is a flowchart showing the processing procedure of the speech processing apparatus 1150 according to this embodiment. This flowchart is executed by the CPU of the speech processing apparatus 1150 using a RAM to implement the functional components shown in FIG. 11. Note that the same step numbers as in FIG. 10 denote the same steps in FIG. 13, and a description thereof will be omitted.

In step S1301, the speech processing apparatus 1150 acquires the frequency band of noise from a noise source. In step S1303, the speech processing apparatus 1150 acquires the frequency band of the speech of the speaker of interest. Note that since the purpose of this embodiment is noise suppression, a case where the frequency band of the speech of the speaker of interest is not taken into consideration can also occur. In step S1305, the speech processing apparatus 1150 selects microphones (or output signals) based on the frequency band of the noise or speech.

According to this embodiment, appropriate microphones are used in accordance with the frequency band of the speaker of interest or a noise source. It is therefore possible to more appropriately perform noise suppression processing for the speech of the speaker of interest.

Fifth Embodiment

A speech processing system according to the fifth embodiment of the present invention will be described next. The speech processing system according to this embodiment is different from the third and fourth embodiments in that appropriate microphones are selected and used in accordance with the output of a noise suppressor. The rest of the components and operations is the same as in the third or fourth embodiment.

Hence, the same reference numerals denote the same components and operations, and a detailed description thereof will be omitted.

<<Speech Processing Apparatus>>

Figure 14:
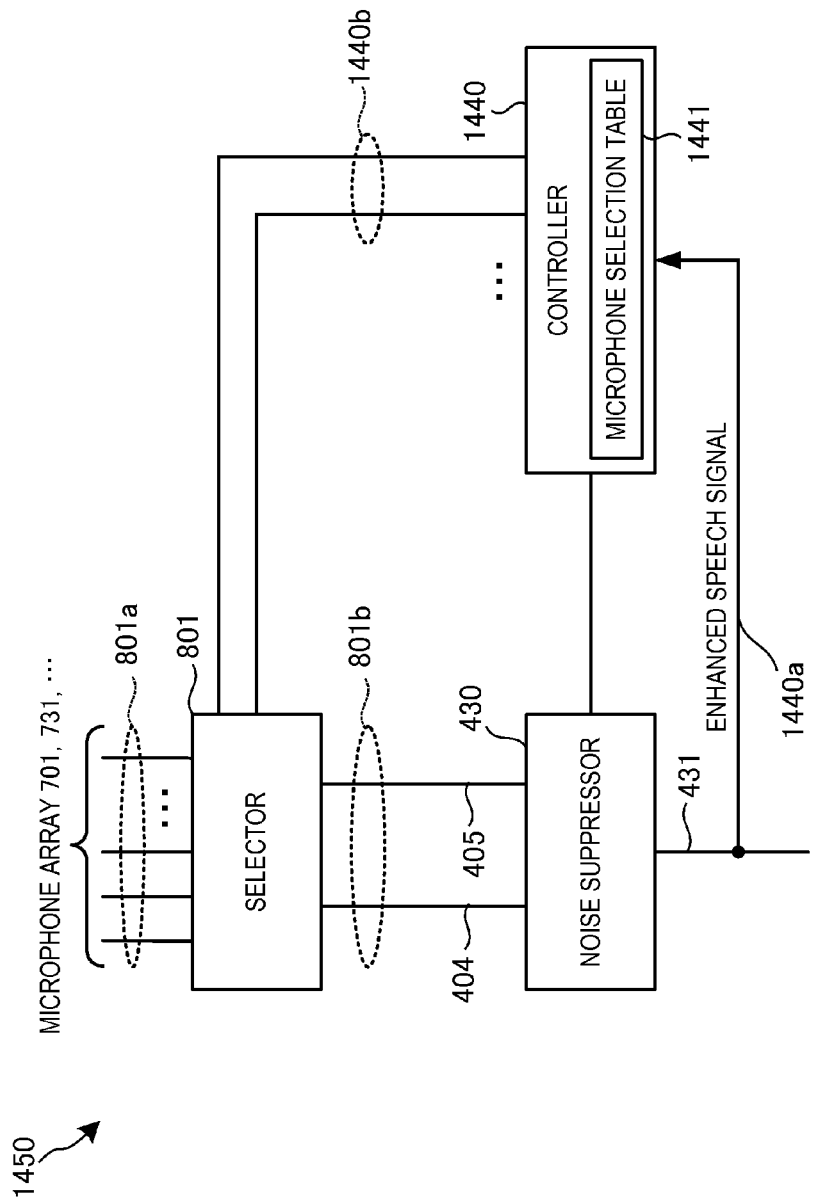
FIG. 14 is a block diagram showing the arrangement of a speech processing apparatus according to the fifth embodiment of the present invention.

FIG. 14 is a block diagram showing the arrangement of a speech processing apparatus 1450 according to this embodiment. Note that the same reference numerals as in FIG. 8 denote the same constituent elements in FIG. 14, and a description thereof will be omitted.

A controller 1440 includes a microphone selection table 1441 (see FIG. 15), and outputs selection signals 1440b to a selector 801 based on an enhanced speech signal 1440a that is the output from a noise suppressor 430. Note that signal selection by the selector 801 can be performed by the gate of each signal of the selection signals 1440b or based on the binary values of the selection signals 1440b.

In addition, the controller 1440 controls noise suppression by the speech processing apparatus 1450. For example, if the passenger instructs to output speech or music from the loudspeakers or instructs to activate the air conditioner, noise suppression using two microphones of a microphone array 701 or 731 is activated. Hence, if speech output from the loudspeakers or the air conditioner is off, control may be done to use only one microphone or perform suppression processing of noise in the vehicle different from this embodiment. In addition, for noise from another noise source such as noise coming from outside of the vehicle through an open window, appropriate microphones are selected by detecting a passenger's instruction to open the window or opening of the window.

Note that in FIG. 14, the selector 801 selects outputs 801a from the microphones of the microphone array 701 or 731. However, only appropriate microphones to be used may be selected and operated. A signal to be fed back for the noise suppressor 430 to the controller 1440 is not limited to the enhanced speech signal 1440a. A correlation value between a signal on a line 404 and a signal on a line 431 or a combination of power ratios, which serves as an index of noise suppression, may be used.

(Microphone Selection Table)

FIG. 15 is a view showing the arrangement of the microphone selection table 1441 according to this embodiment. The microphone selection table 1441 is used by the controller 1440 to select a mixture signal output from a microphone in correspondence with a noise suppression effect determined from the feedback signal from the noise suppressor 430.

The microphone selection table 1441 stores an enhanced speech signal 1502 fed back from the noise suppressor 430 and a noise suppression effect 1503 determined from the enhanced speech signal 1502 in association with a selected microphone pair 1501. The microphone selection table 1441 stores whether to use the selected microphone pair 1501 as selection/nonselection 1504 based on the noise suppression effect 1503. Note that as for selection of the microphone pair, a microphone pair corresponding to the highest noise suppression effect 1503 is selected. In a case where the number of microphones in a microphone array is large, a microphone pair may be selected when the noise suppression effect 1503 exceeds a predetermined threshold. Alternatively, a microphone pair predicted to have a high noise suppression effect may be selected in advance, and the noise suppression effects 1503 may be compared.

<<Processing Procedure of Speech Processing Apparatus>>

Figure 16:
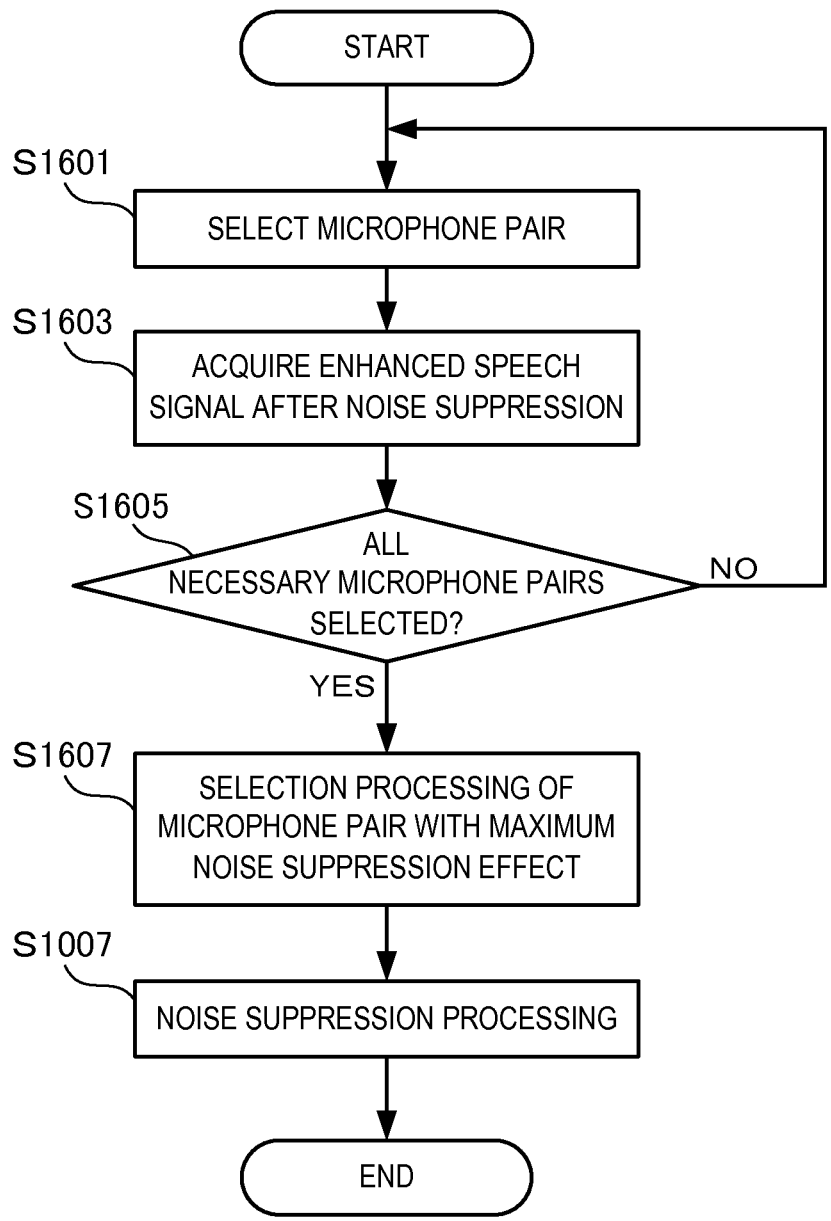
FIG. 16 is a flowchart showing the processing procedure of the speech processing apparatus according to the fifth embodiment of the present invention.

FIG. 16 is a flowchart showing the processing procedure of the speech processing apparatus 1450 according to this embodiment. This flowchart is executed by the CPU of the speech processing apparatus 1450 using a RAM to implement the functional components shown in FIG. 14. Note that the same step numbers as in FIG. 10 denote the same steps in FIG. 16, and a description thereof will be omitted.

In step S1601, the speech processing apparatus 1450 selects one microphone pair to test noise suppression. In step S1603, the speech processing apparatus 1450 acquires an enhanced speech signal after noise suppression from the noise suppressor 430, and holds it in the microphone selection table 1441. In step S1605, the speech processing apparatus 1450 determines whether all microphone pairs that need a test are selected. Steps S1601 and S1603 are repeated until all microphones are selected, and the test ends.

When all microphone pairs are selected and tested, in step S1607, the speech processing apparatus 1450 selects a mixture signal from a microphone pair of the highest noise suppression effect as a mixture signal to be input to the noise suppressor 430.

According to this embodiment, appropriate microphones are selected by feeding back the noise suppression effect. It is therefore possible to more reliably perform noise suppression processing for the speech of the speaker of interest.

Sixth Embodiment

A speech processing system according to the sixth embodiment of the present invention will be described next. The speech processing system according to this embodiment is different from the third to fifth embodiments in that a plurality of sets of microphones appropriate for noise suppression are selected and used. The rest of the components and operations is the same as in the third, fourth, or fifth embodiment. Hence, the same reference numerals denote the same components and operations, and a detailed description thereof will be omitted.

<<Speech Processing Apparatus>>

Figure 17:
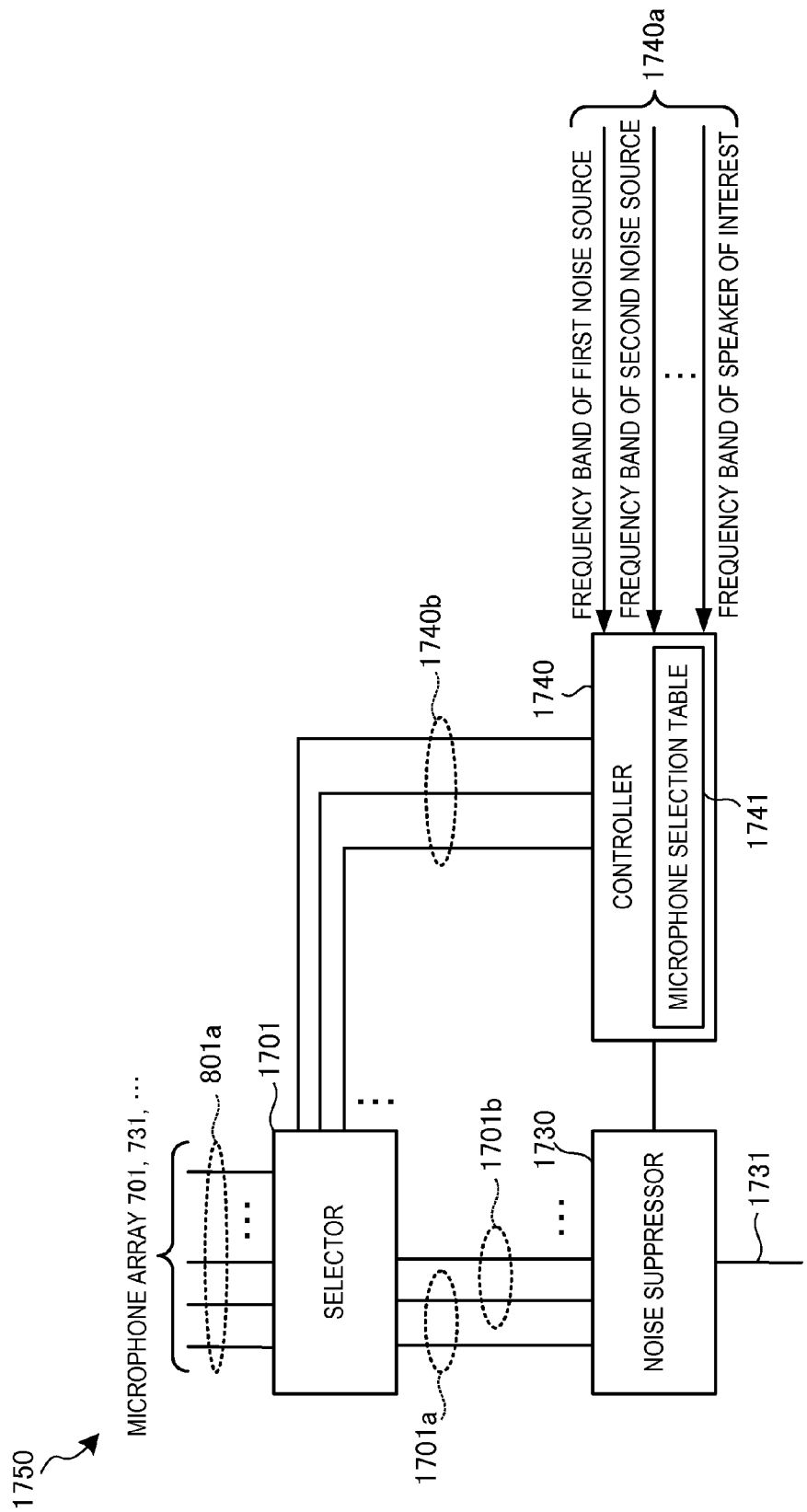
FIG. 17 is a block diagram showing the arrangement of a speech processing apparatus according to the sixth embodiment of the present invention.

FIG. 17 is a block diagram showing the arrangement of a speech processing apparatus 1750 according to this embodiment. Note that the same reference numerals as in FIG. 8 denote the same constituent elements in FIG. 17, and a description thereof will be omitted.

A selector 1701 selects a plurality of sets 1701a and 1701b of mixture signals to be input to a noise suppressor 1730 from outputs 801a of a plurality of microphones of a microphone array 701 or 731. The number of microphone sets to be selected is not limited. The number of microphone sets to be selected depends on how widely and how finely the difference in the type of noise from a plurality of noise sources or the difference in the type between noise and speech of interest is to be suppressed. Note that in FIG. 17, two sets are formed using three mixture signals while sharing one of them and selected. However, four mixture signals may be selected as two independent sets.

The noise suppressor 1730 suppresses noise from the plurality of sets 1701a and 1701b of mixture signals. The noise suppressor 1730 then outputs an enhanced speech signal 1731 (see FIG. 18).

A controller 1740 includes a microphone selection table 1741 (see FIGS. 19A and 19B), and outputs selection signals 1740b for selecting plurality of sets to the selector 1701 based on a plurality of conditions 1740a of the speaker of interest and noise sources. As the plurality of conditions of the speaker of interest and noise sources, for example, the type of a driven noise source, a seat position corresponding to the position of the speaker of interest or a noise source position, the frequency band of the speech of the speaker of interest or noise from the noise source, and the like are usable. Note that signal selection by the selector 1701 can be performed by the gate of each signal of the selection signals 1740b or based on the binary values of the selection signals 1740b.

In addition, the controller 1740 controls noise suppression by the speech processing apparatus 1750. For example, if the passenger instructs to output speech or music from the loudspeakers or instructs to activate the air conditioner, noise suppression using two microphones of the microphone array 701 or 731 is activated. Hence, if speech output from the loudspeakers or the air conditioner is off, control may be done to use only one microphone or perform suppression processing of noise in the vehicle different from this embodiment.

In addition, for noise from another noise source such as noise coming from outside of the vehicle through an open window, appropriate microphones may be selected in association with the position of the speaker 220 of interest. In this case, appropriate microphones are selected by detecting a passenger's instruction to open the window or opening of the window.

Note that in FIG. 17, the selector 1701 selects the outputs 801a from the microphones of the microphone array 701 or 731. However, only appropriate microphones to be used may be selected and operated. Additionally, in FIG. 17, input to the controller 1740 has been described as the frequency bands of speech and noise. However, conditions of speech and noise that are not limited to these can be used.

(Noise Suppressor)

Figure 18:
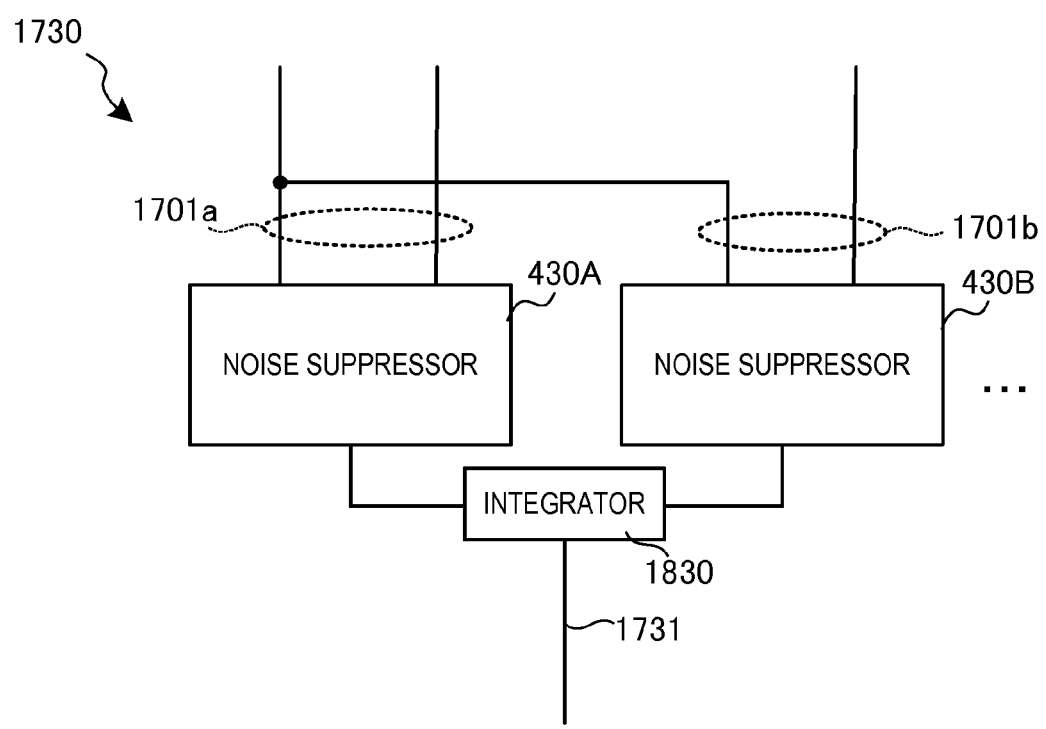
FIG. 18 is a block diagram showing the arrangement of a noise suppressor according to the sixth embodiment of the present invention.

FIG. 18 is a block diagram showing the arrangement of the noise suppressor 1730 according to this embodiment.

The noise suppressor 1730 in the speech processing apparatus 1750 shown in FIG. 17 includes a noise suppressor 430A that inputs the plurality of sets 1701a of mixture signals and suppresses noise, and a noise suppressor 430B that inputs the plurality of sets 1701b of mixture signals and suppresses noise. The noise suppressor 1730 also includes an integrator 1830 that adds an enhanced speech signal that is the output from the noise suppressor 430A and an enhanced speech signal that is the output from the noise suppressor 430B and generates the enhanced speech signal 1731 that is the output from the noise suppressor 1730.

Note that the integrator 1830 shown in FIG. 18 may be configured to perform noise suppression for two sets of mixture signals using the plurality of independent noise suppressors and add the enhanced speech signals that are the outputs of the noise suppressors. However, the arrangement is not limited to this. For example, the integrator may be configured to do frequency division, select or weight and add a plurality of enhanced signals on a frequency basis, and integrate the frequencies. Alternatively, the noise suppressor 1730 may be configured as a noise suppressor that inputs three mixture signals or a noise suppressor that inputs N mixture signals.

(Microphone Selection Table)

FIG. 19A is a view showing the arrangement of a microphone selection table 1741A according to this embodiment. The microphone selection table 1741A is an example of the microphone selection table 1741 shown in FIG. 17. The microphone selection table 1741A is used by the controller 1740 to select a plurality of sets of mixture signals output from a plurality of microphone sets out of a combination of the condition of the speaker of interest and the conditions of the plurality of noise sources.

The microphone selection table 1741A stores a selection 1915 of a plurality of appropriate microphone sets in association with a combination of a position 1911 of the speaker of interest, a position 1912 of a first noise source, a position 1913 of a second noise source, and a position 1914 of an nth noise source. Referring to FIG. 19A, a set of mixture signals ○ and a set of mixture signals Δ are used as noise suppression in the noise suppressor 1730.

FIG. 19B is a view showing the arrangement of a microphone selection table 1741B according to this embodiment. The microphone selection table 1741B is another example of the microphone selection table 1741 shown in FIG. 17. The microphone selection table 1741B is used by the controller 1740 to select a plurality of sets of mixture signals output from a plurality of microphone sets out of a combination of the condition of the speaker of interest and the conditions of the plurality of noise sources.

The microphone selection table 1741B stores a selection 1925 of a plurality of appropriate microphone sets in association with a combination of a frequency band 1921 of the speech of the speaker of interest, a frequency band 1922 of a first noise source, a frequency band 1923 of a second noise source, and a frequency band 1924 of an nth noise source. Referring to FIG. 19B, a set of mixture signals ○, a set of mixture signals Δ, and a set of mixture signals □ are used as noise suppression in the noise suppressor 1730.

Note that the condition of the speaker of interest and the conditions of the plurality of noise sources are not limited to the positions or frequency bands.

According to this embodiment, microphone sets that meet the plurality of conditions of noise suppression are used. It is therefore possible to implement suppression of noise in a wider range for the speech of the speaker of interest.

Seventh Embodiment

A speech processing system according to the seventh embodiment of the present invention will be described next. The speech processing system according to this embodiment is different from the second embodiment in that a microphone matrix is provided in which a plurality of microphones are arranged in a direction to connect a noise source and the passenger and also in a direction crossing the direction at a right angle. The rest of the components and operations is the same as in the second embodiment. Hence, the same reference numerals denote the same components and operations, and a detailed description thereof will be omitted.

<<Outline of Speech Processing System>>

Figure 20:
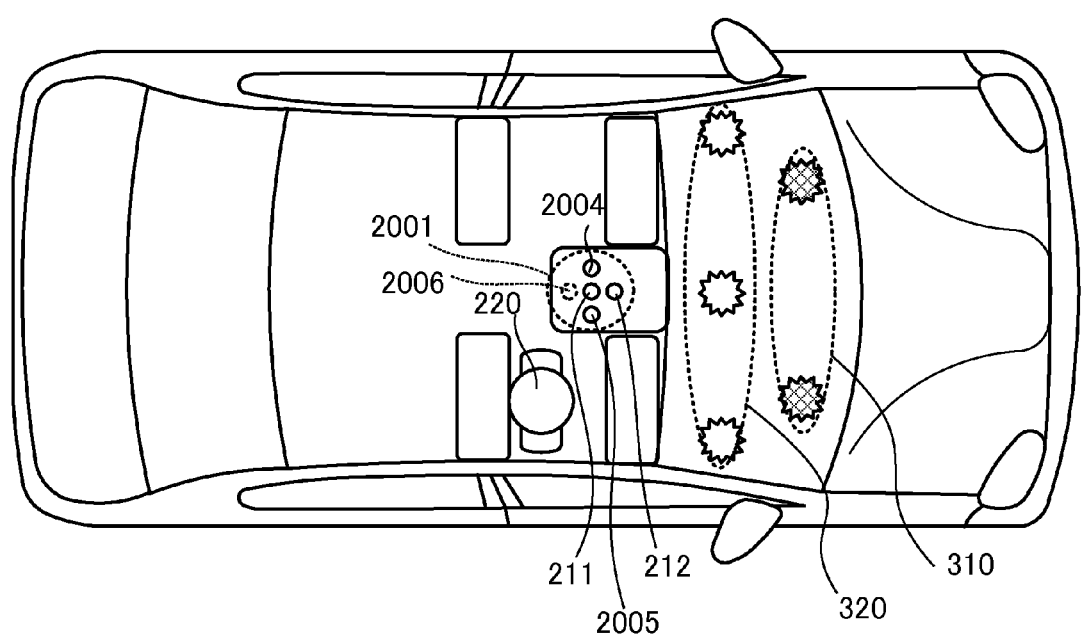
FIG. 20 is a view showing the outline of a speech processing system according to the seventh embodiment of the present invention.

FIG. 20 is a view showing the outline of a speech processing system 2000 according to this embodiment. Note that the same reference numerals as in FIG. 3B denote the same constituent elements in FIG. 20, and a description thereof will be omitted.

Referring to FIG. 20, the speech processing system includes a plurality of microphones 2004 and 2005 arranged in a direction perpendicular to a line that passes through a speaker 220 of interest and noise source regions 310 and 320, in addition to the microphone array of a plurality of microphones 211 and 212. A microphone 2006 may also be provided as an option. A microphone matrix 2001 with such microphones arranged in the longitudinal and lateral directions is arranged on the ceiling in the vehicle.

The plurality of microphones 2004 and 2005 are used to discriminate between the speech of the passenger in the driver's seat and the speech of the passenger in the assistant driver's seat or suppress not only noise from a noise source on the front side such as the noise source region 310 or 320 but also noise from the left and right sides of the speaker of interest.

According to this embodiment, it is possible to extract correct speech of the speaker of interest by suppressing not only noise sources placed in the lateral direction with respect to the speaker of interest but also disturbance by the speech of the adjacent passenger.

Eighth Embodiment

A speech processing system according to the eighth embodiment of the present invention will be described next. The speech processing system according to this embodiment is different from the second to seventh embodiments in that the present invention is applied not to a vehicle but to a living room. The rest of the components and operations is the same as in the second to seventh embodiments. Hence, the same reference numerals denote the same components and operations, and a detailed description thereof will be omitted.

<<Outline of Speech Processing System>>

FIG. 21 is a view showing the outline of a speech processing system 2100 according to this embodiment.

Referring to FIG. 21, a person (not shown) in the living room is assumed to be a speaker of interest, and a loudspeaker of a TV set 2110 is assumed to be a noise source. Each of microphone arrays 2111 to 2141 is formed from two microphones arranged on the ceiling or on the upper portion of a wall in a direction to connect the speaker of interest and the noise source. The microphone arrays 2111 and 2131 enhance the speech of a person who is on the near side of the drawing and suppress noise from the TV set 2110. The microphone arrays 2121 and 2141 enhance the speech of a person who is near the sofa on the far side of the drawing and suppress noise from the TV set 2110.

Hence, when the plurality of microphone arrays 2111 to 2141 are arranged, an appropriate microphone array is selected in correspondence with the position of the speaker of interest. For example, the position of the speaker of interest may be selected by providing a motion sensor.

According to this embodiment, it is possible to extract correct speech of the speaker of interest by suppressing speech from the TV set or the like in the living room.

Other Embodiments

Note that in the above embodiments, the vehicles according to the second to seventh embodiments and the living room according to the eighth embodiment have been described as examples of the environment where the speaker of interest and noise sources exist in a closed space. However, the closed space in which the speaker of interest and noise sources coexist is not limited to these examples. The embodiments can be applied to various scenes in which noise from a noise source spreading in the lateral direction is suppressed, and the speech of the speaker of interest is enhanced in a closed space where the speaker of interest and the noise source coexist, and the same effects as described above can be attained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when a speech processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

This application claims the benefit of Japanese Patent Application No. 2013-109006 filed on May 23, 2013, which is hereby incorporated by reference herein in its entirety.

What is claimed is:

1. A speech processing system comprising:
at least one hardware processor configured to implement:
a linear microphone array comprising a plurality of microphones, arranged on a straight line, each of which inputs speech of a speaker of interest and noise from a noise source region comprising a plurality of noise sources, and outputs a mixture signal comprising said speech and said noise; and
a noise suppressor that suppresses said noise based on said mixture signals,
wherein a direction of arranging the plurality of microphones in said linear microphone array is determined such that said straight line is perpendicular to a longitudinal axis of said noise source region, and
a distance, between said linear microphone array and said noise source region, and a tilt of a placement plane of said microphone array are adjusted so as to decrease differences between respective distances from each of noise sources in said noise source region to the plurality of microphones in said linear microphone array.

2. The speech processing system according to claim 1, wherein said linear microphone array comprises not less than three microphones arranged on a straight line, and
the at least one hardware processor is further configured to implement:
a selector that selects, out of the not less than three microphones, microphones to output the mixture signals used by said noise suppressor.

3. The speech processing system according to claim 2, wherein said selector selects, out of the not less than three microphones, microphones to output the mixture signals used by said noise suppressor in accordance with a type of driven noise sources.

4. The speech processing system according to claim 2, wherein said selector selects, out of the not less than three microphones, microphones to output the mixture signals used by said noise suppressor in accordance with a position of the speaker of interest.

5. The speech processing system according to claim 2, wherein said selector selects, out of the not less than three microphones, microphones to output the mixture signals used by said noise suppressor in accordance with a frequency of the noise generated from the noise source region.

6. The speech processing system according to claim 2, wherein said selector selects, out of the not less than three microphones, microphones to output the mixture signals used by said noise suppressor in accordance with a frequency of noise generated from a noise source placed outside the noise source region.

7. The speech processing system according to claim 1, further comprising, in addition to said linear microphone array, at least two microphones arranged in a direction approximately perpendicular to a direction in which the plurality of microphones are arranged in said linear microphone array; and wherein said selector selects, in accordance with noise from a lateral direction to the direction in which the plurality of microphones are arranged, the at least two microphones that are arranged in the direction perpendicular to the direction in which the plurality of microphones are arranged.

8. The speech processing system according to claim 1, wherein an interval between microphones in said linear microphone array is less than 10 cm and falls within a range of 2 cm to 4 cm.

9. The speech processing system according to claim 1, wherein the speaker of interest, the noise source region, and the linear microphone array exist in a closed space, and said linear microphone array is placed on a ceiling of the closed space.

10. The speech processing system according to claim 9, wherein the closed space is a space in a vehicle, said linear microphone array is placed on a ceiling above a sun visor, and portions of the sun visor overlapping the microphones are processed to pass a sound so as to prevent the sun visor from blocking the sound to the microphones of said linear microphone array.

11. A speech processing system comprising:

at least one hardware processor configured to implement:

a first microphone that is placed on a ceiling in a vehicle, inputs a sound mixture comprising noise from a noise source region comprising a plurality of noise sources and a voice of a passenger of the vehicle, and outputs a first mixture signal;

a second microphone that is placed on the ceiling in the vehicle such that a straight line, on which the first microphone and the second microphone are placed, of a linear microphone array, comprising the first microphone and the second microphone, is perpendicular to a longitudinal axis of said noise source region, inputs a sound mixture comprising the noise from the noise source region and the voice of the passenger of the vehicle, and outputs a second mixture signal; and a noise suppressor that outputs an enhanced speech signal based on the first mixture signal and the second mixture signal, wherein a distance, between said linear microphone array and said noise source region, and a tilt of a placement plane of said microphone array are adjusted so as to decrease differences between respective distances from each of noise sources in said noise source region to the first microphone and the second microphone in said linear microphone array.

12. A vehicle comprising the speech processing system according to claim 11.

13. A microphone placing method comprising:

arranging on a straight line a plurality of microphones, each of which inputs a sound mixture, comprising speech of a speaker of interest and noise from a noise source region comprising a plurality of noise sources, and outputs a mixture signal comprising a speech signal and a noise signal, wherein the plurality of microphones are of a linear microphone array and are arranged on the straight line perpendicular to a longitudinal axis of said noise source region, and a distance, between said linear microphone array and said noise source region, and a tilt of a placement plane of said microphone array are adjusted so as to decrease differences between respective distances from each of noise sources in said noise source region to the plurality of microphones in said linear microphone array.

14. A speech processing method comprising:

at least one hardware processor configured to implement:

selecting microphones, to output a plurality of mixture signals comprising a speech signal and a noise signal, out of a plurality of microphones, each of which inputs a sound mixture, comprising speech of the speaker of interest and noise from a noise source region comprising a plurality of noise sources, and outputs the mixture signal, the selected microphones are of a linear microphone array and are arranged on a straight line perpendicular to a longitudinal axis of said noise source region; and suppressing the noise based on the mixture signals output from the selected microphones, and wherein a distance, between said linear microphone array and said noise source region, and a tilt of a placement plane of said microphone array are adjusted so as to decrease differences between respective distances from each of noise sources in said noise source region to the plurality of microphones in said linear microphone array.

15. A non-transitory computer readable storage medium storing a speech processing program for causing a computer to execute a method, comprising:

implementing by at least one hardware processor:

selecting microphones, to output a plurality of mixture signals comprising a speech signal and a noise signal, out of a plurality of microphones, each of which inputs a sound mixture, comprising speech of the speaker of interest and noise from a noise source region comprising a plurality of noise sources, and outputs the mixture signal, the selected microphones are of a linear microphone array and are arranged on a straight line perpendicular to a longitudinal axis of said noise source region; and suppressing the noise based on the mixture signals output from the selected microphones, wherein a distance, between said linear microphone array and said noise source region, and a tilt of a placement plane of said microphone array are adjusted so as to decrease differences between respective distances from each of noise sources in said noise source region to the plurality of microphones in said linear microphone array.

* * * * *